(12) United States Patent
Lou et al.

(10) Patent No.: US 10,499,343 B2
(45) Date of Patent: Dec. 3, 2019

(54) MULTI-USER POWER CONTROL METHODS AND PROCEDURES

(71) Applicant: INTERDIGITAL PATENT HOLDINGS, INC., Wilmington, DE (US)

(72) Inventors: Hanqing Lou, Syosset, NY (US); Oghenekome Oteri, San Diego, CA (US); Guodong Zhang, Syosset, NY (US); Robert L. Olesen, Huntington, NY (US); Rui Yang, Greenlawn, NY (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 0 days.

(21) Appl. No.: 15/755,804

(22) PCT Filed: Sep. 9, 2016

(86) PCT No.: PCT/US2016/050882
§ 371 (c)(1),
(2) Date: Feb. 27, 2018

(87) PCT Pub. No.: WO2017/044696
PCT Pub. Date: Mar. 16, 2017

(65) Prior Publication Data
US 2018/0332540 A1 Nov. 15, 2018

Related U.S. Application Data

(60) Provisional application No. 62/216,666, filed on Sep. 10, 2015, provisional application No. 62/245,325, filed on Oct. 23, 2015.

(51) Int. Cl.
*H01Q 11/12* (2006.01)
*H04W 52/14* (2009.01)
(Continued)

(52) U.S. Cl.
CPC ......... *H04W 52/146* (2013.01); *H04W 52/10* (2013.01); *H04W 52/242* (2013.01);
(Continued)

(58) Field of Classification Search
CPC ............ H04W 52/146; H04W 52/367; H04W 72/0473; H04W 52/243; H04W 48/12
(Continued)

(56) References Cited

U.S. PATENT DOCUMENTS

| 8,340,593 | B2 | 12/2012 | Yang et al. |
| 9,807,699 | B2 | 10/2017 | Oteri et al. |

(Continued)

FOREIGN PATENT DOCUMENTS

| EP | 2 464 176 | 6/2012 |
| WO | 14/071308 | 5/2014 |

(Continued)

OTHER PUBLICATIONS

Holma et al., WCDMA for UMTS, 5th edition, John Wiley and Sons, Ltd., Publishers (2010).
(Continued)

*Primary Examiner* — Tu X Nguyen
(74) *Attorney, Agent, or Firm* — Volpe and Koenig, P.C.

(57) ABSTRACT

Methods and systems for operation in a WLAN are provided. Methods and systems for a transmit power control (TPC) scheme are disclosed. In an embodiment, an access point (AP) may send a trigger frame to one or more stations (STAs) for synchronizing and scheduling uplink (UL) multi-user (MU) transmissions. The trigger frame may contain an open-loop power control index 1 and a power adjustment index 2. The one or more STAs may estimate pathloss using an indicated AP transmit power and received power to set a baseline transmit power. The one or more STAs may adjust (Continued)

their transmit power in the UL transmission period to be the indicated target receive power at the AP.

8 Claims, 14 Drawing Sheets

(51) Int. Cl.
| | |
|---|---|
| *H04W 52/24* | (2009.01) |
| *H04W 52/10* | (2009.01) |
| *H04W 74/00* | (2009.01) |
| *H04W 84/12* | (2009.01) |
| *H04W 52/22* | (2009.01) |
| *H04B 17/318* | (2015.01) |
| *H04W 88/02* | (2009.01) |

(52) U.S. Cl.
CPC ....... *H04W 52/245* (2013.01); *H04W 52/246* (2013.01); *H04W 74/006* (2013.01); *H04B 17/318* (2015.01); *H04W 52/228* (2013.01); *H04W 52/241* (2013.01); *H04W 84/12* (2013.01); *H04W 88/02* (2013.01)

(58) Field of Classification Search
USPC ...................................... 455/127.1, 443, 448
See application file for complete search history.

(56) References Cited

U.S. PATENT DOCUMENTS

| | | | |
|---|---|---|---|
| 2011/0159911 A1 | 6/2011 | Chen et al. | |
| 2011/0176498 A1 | 7/2011 | Montojo et al. | |
| 2013/0040675 A1* | 2/2013 | Ant ..................... | H04W 52/226 455/509 |
| 2013/0065631 A1 | 3/2013 | Lu | |
| 2014/0369322 A1 | 12/2014 | Fwu et al. | |
| 2015/0063258 A1 | 3/2015 | Merlin et al. | |
| 2015/0156788 A1 | 6/2015 | Yu et al. | |
| 2016/0100370 A1 | 4/2016 | Rong et al. | |
| 2016/0119881 A1 | 4/2016 | Merlin et al. | |
| 2016/0302156 A1 | 10/2016 | Choi et al. | |

FOREIGN PATENT DOCUMENTS

| | | |
|---|---|---|
| WO | 15/038930 | 3/2015 |
| WO | 2016069568 A1 | 5/2016 |
| WO | 17/040788 | 3/2017 |

OTHER PUBLICATIONS

Aboul-Magd, "802.11 HEW SG Proposed PAR," IEEE 802.11-14/0165r0 (Jan. 22, 2014).
Aboul-Magd, "802.11 HEW SG Proposed PAR," IEEE 802.11-14/0165r1 (Mar. 17, 2014).
Aboul-Magd, "IEEE 802.11 HEW SG Proposed CSD," IEEE 802.11-14/0169r0 (Jan. 22, 2014).
Aboul-Magd, "IEEE 802.11 HEW SG Proposed CSD," IEEE 802.11-14/0169r1 (Mar. 18, 2014).
Bellalta et al., "Next generation IEEE 802.11 Wireless Local Area Networks: Current status, future directions and open challenges," Computer Communications (2015).
Bharadwaj et al., "Requirements for UL MU Transmission," IEEE 802.11-16/0053 (Jan. 18, 2016).
Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 6: Sub 1 GHz License Exempt Operation, IEEE P802.11ah/D5.0 (Mar. 2015).
Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 6: Enhancments for High Efficiency WLAN, IEEE P802.11ax/D0.4 (Aug. 2016).
Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Enhancements for Very High Throughput for Operation in Bands below 6GHz, IEEE P802.11ac/D1.0 (May 2011).
Ghosh et al., "Random Access with Trigger Frames using OFDMA," IEEE 802.11-15/0875r1 (Jul. 13, 2015).
Harkins, "Secure Password Ciphersuites for Transport Layer Security (TLS)," Transport Layer Security, Internet-Draft, draft-harkins-tls-dragonfly-00 (Aug. 5, 2016).
IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band, IEEE P802.11ad-2012 (Dec. 2012).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2012 (Mar. 29, 2012).
IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
Kowalik et al., "Practical Issues of Power Control in IEEE 802.11 Wireless Devices," International Conference on Telecommunications, pp. 1-5 (Jun. 2008).
Liu et al., "Open-Loop Link Margin Index for Fast Link Adaptation," IEEE 802.11-12/0645 (May 10, 2012).
Merlin et al., "Trigger Frame Format," IEEE 802.11-15/0877r1 (Jul. 13, 2015).
Oteri et al., "Power Control for Multi-User Transmission in 802.11ax," IEEE 802.11-16/0331r2 (Mar. 13, 2016).
Sesia et al., "LTE—The UMTS Long Term Evolution: From Theory to Practice," John Wiley & Sons, Ltd., 2nd edition (2011).
Stacey et al., "Proposed TGax draft specification," IEEE 802.11-16/0024r1 (Mar. 2, 2016).
Stacey, "Specification Framework for TGax," IEEE P802.11 Wireless LANs, IEEE 802.11-15/0132r7 (Jul. 20, 2015).
Ryu et al., "UL MU Procedure," IEEE 802.11-15/0365r0 (Mar. 9, 2015).

* cited by examiner

FIG. 2

| Element ID 202 | Length 204 | Open-Loop Link Margin Index 206 |
|---|---|---|
| 1 | 1 | 1 |

Octets:

| FC | Duration | (A1) | A2 | Common Info | Per User Info 1 | ... | Per User Info N | FCS |
|---|---|---|---|---|---|---|---|---|
| 2 | 2 | TBD | 6 | TBD | TBD | | TBD | 4 |

Octets:

MULTI-USER POWER CONTROL METHODS AND PROCEDURES

CROSS REFERENCE TO RELATED APPLICATIONS

This application is the U.S. National Stage, under 35 U.S.C. § 371, of International Application No. PCT/US2016/050882 filed Sep. 9, 2016, which claims the benefit of U.S. Provisional Application No. 62/216,666 filed on Sep. 10, 2015 and U.S. Provisional Application No. 62/245,325 filed on Oct. 23, 2015, 62/093,935, the contents of which are hereby incorporated by reference herein.

BACKGROUND

A wireless local area network (WLAN) is a wireless computer network that links two or more devices using a wireless distribution method (often spread-spectrum or OFDM radio) within a limited area such as a home, school, computer laboratory, or office building. This gives users the ability to move around within a local coverage area and yet still be connected to the network. A WLAN can also provide a connection to the wider Internet. Most modern WLANs are based on IEEE 802.11 standards

SUMMARY

The following description includes methods, systems, and apparatuses for performing a transmit power control (TPC) procedure in a wireless local area network (WLAN). Embodiments include: receiving, by a station (STA), a trigger frame from an access point (AP) indicating that the STA is a candidate for an upcoming uplink (UL) multi-user (MU) transmission opportunity, the trigger frame comprising a first index indicating an open-loop power control parameter and a second index indicating a power alignment parameter; determining, by the STA, a baseline transmit power based on one or more of the trigger frame, the first index, or the second index; and sending, by the STA, a data transmission to the AP in one or more assigned resource units of the UL MU transmission opportunity using the baseline transmit power.

In addition, embodiments include a station (STA) for performing the transmit power control (TPC) procedure. The STA may include: at least one receive circuit configured to receive a trigger frame from an access point (AP) indicating that the STA is a candidate for an upcoming uplink (UL) multi-user (MU) transmission opportunity, the trigger frame comprising a first index indicating an open-loop power control parameter and a second index indicating a power alignment parameter; at least one processor configured to determine a baseline transmit power based on one or more of the trigger frame, the first index, or the second index; and at least one transmit circuit configured to send a data transmission to the AP in one or more assigned resource units of the UL MU transmission opportunity using the baseline transmit power.

Embodiments also include: receiving, by a station (STA), a downlink (DL) data transmission from an access point (AP), wherein a header of the DL data transmission comprises a first index indicating an open-loop power control parameter and a second index indicating a power alignment parameter; determining, by the STA, a baseline transmit power based on one or more of the first index and the second index; and sending, by the STA, an uplink (UL) data transmission to the AP using the baseline transmit power.

BRIEF DESCRIPTION OF THE DRAWINGS

A more detailed understanding may be had from the following description, given by way of example in conjunction with the accompanying drawings wherein:

FIG. 2 illustrates a sub 1 ghz (S1G) open-loop link margin index element as defined in IEEE 802.11ah;

FIG. 3 illustrates a preliminary trigger frame format as proposed for IEEE 802.11;

DETAILED DESCRIPTION

Figure 1A:
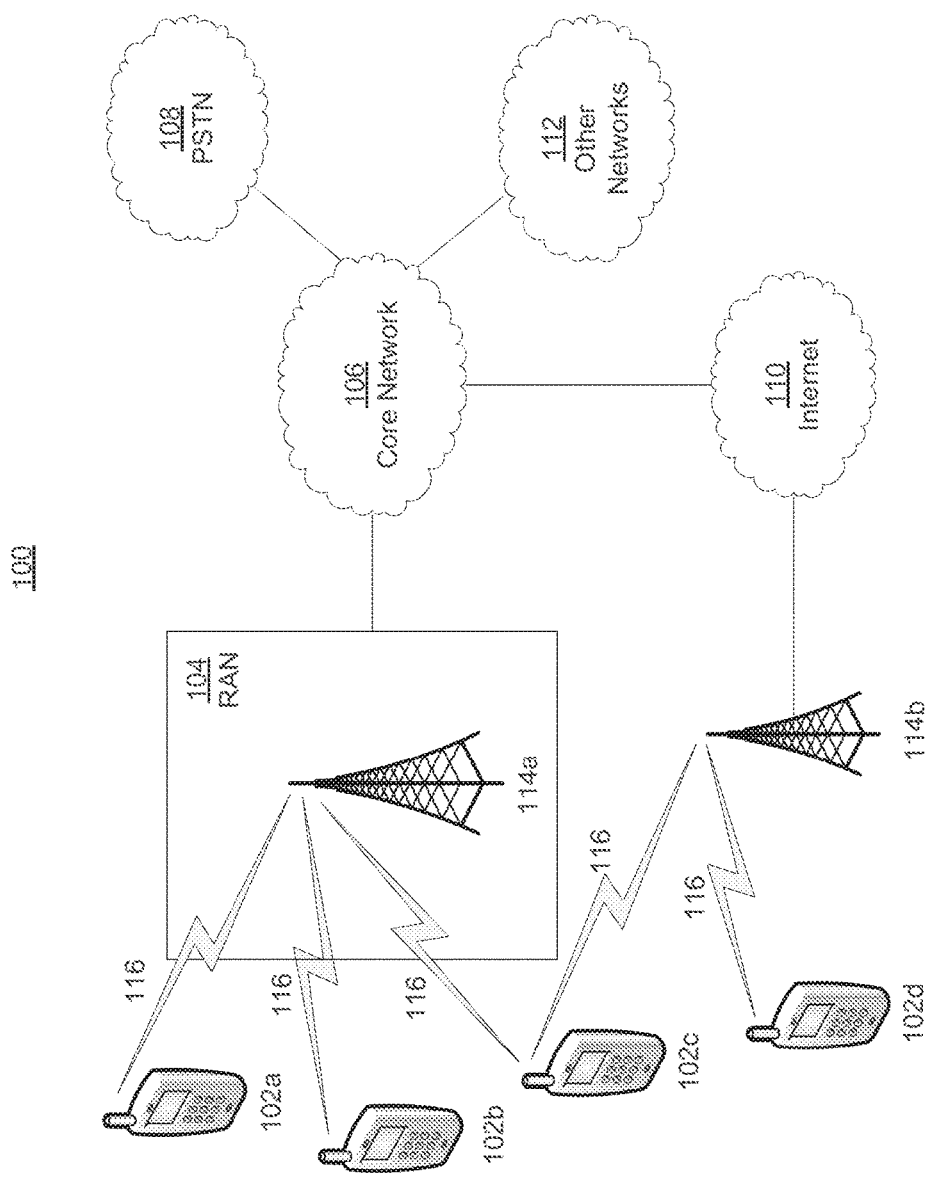
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114*b*, which may employ an IEEE 802 radio technology.

Figure 1B:
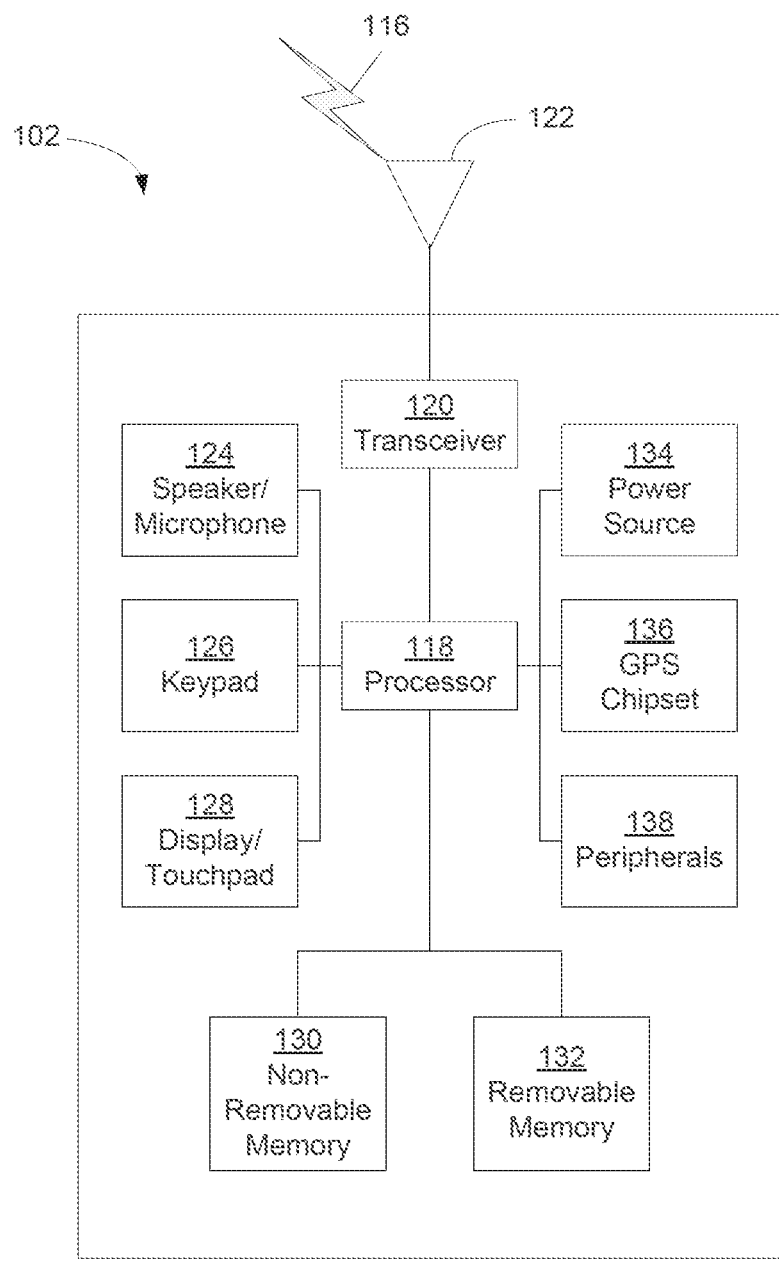
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
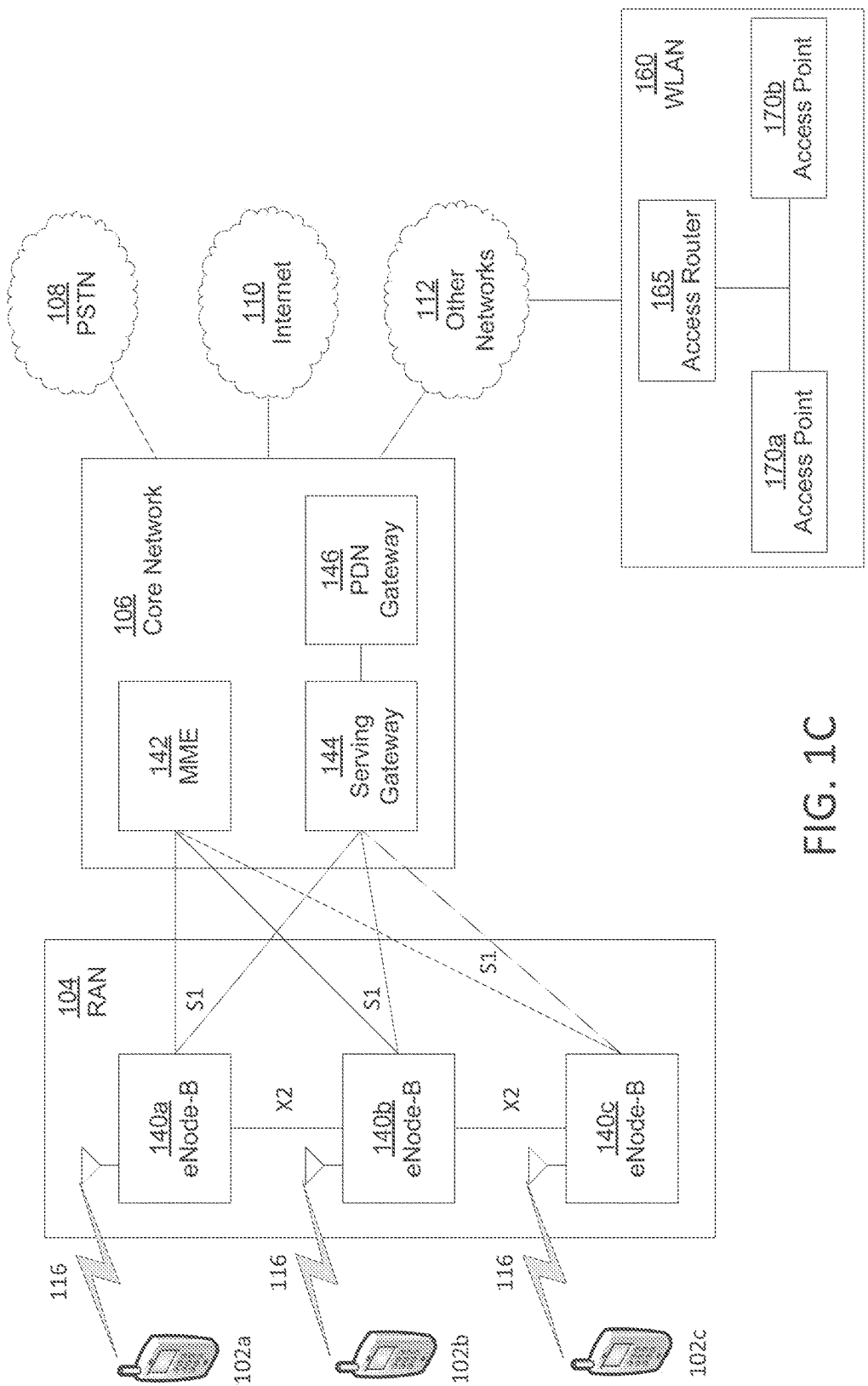
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102*a*, 102*b*, 102*c* over the air interface 116. The RAN 104 may also be in communication with the core network 106.

The RAN 104 may include eNode-Bs 140*a*, 140*b*, 140*c*, though it will be appreciated that the RAN 104 may include any number of eNode-Bs while remaining consistent with an embodiment. The eNode-Bs 140*a*, 140*b*, 140*c* may each include one or more transceivers for communicating with the WTRUs 102*a*, 102*b*, 102*c* over the air interface 116. In one embodiment, the eNode-Bs 140*a*, 140*b*, 140*c* may implement MIMO technology. Thus, the eNode-B 140*a*, for example, may use multiple antennas to transmit wireless signals to, and receive wireless signals from, the WTRU 102*a*.

Each of the eNode-Bs 140*a*, 140*b*, 140*c* may be associated with a particular cell (not shown) and may be configured to handle radio resource management decisions, handover decisions, scheduling of users in the uplink and/or downlink, and the like. As shown in FIG. 1C, the eNode-Bs 140*a*, 140*b*, 140*c* may communicate with one another over an X2 interface.

The core network 106 shown in FIG. 1C may include a mobility management entity gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Other network 112 may further be connected to an IEEE 802.11 based wireless local area network (WLAN) 160. The WLAN 160 may include an access router 165. The access router may contain gateway functionality. The access router 165 may be in communication with a plurality of access points (APs) 170a, 170b. The communication between access router 165 and APs 170a, 170b may be via wired Ethernet (IEEE 802.3 standards), or any type of wireless communication protocol. AP 170a is in wireless communication over an air interface with WTRU 102d.

A WLAN in infrastructure basic service set (BSS) mode may have an access point (AP) for the BSS and one or more stations (STAs) associated with the AP. The AP typically may have access or interface to a distribution system (DS) or another type of wired/wireless network that carries traffic in and out of the BSS. Traffic to STAs that originates from outside the BSS may arrive through the AP and may be delivered to the STAs. Traffic originating from STAs to destinations outside the BSS may be sent to the AP to be delivered to the respective destinations. Traffic between STAs within the BSS may also be sent through the AP, where the source STA sends traffic to the AP and the AP delivers the traffic to the destination STA. Such traffic between STAs within a BSS may be peer-to-peer traffic. Such peer-to-peer traffic may also be sent directly between the source and destination STAs with a direct link setup (DLS) using an IEEE 802.11e DLS or an IEEE 802.11z tunneled DLS (TDLS). A WLAN using an independent BSS (IBSS) mode has no AP, and/or STAs, communicating directly with each other. This mode of communication is referred to as an "ad-hoc" mode of communication.

Using the IEEE 802.11ac infrastructure mode of operation, the AP 170a may transmit a beacon on a fixed channel, usually the primary channel. This channel may be 20 MHz wide, and may be the operating channel of the BSS. This channel may also be used by one or more stations (STAs) to establish a connection with the AP 170a. The fundamental channel access mechanism in an IEEE 802.11 system may be carrier sense multiple access with collision avoidance (CSMA/CA). In this mode of operation, every STA, including the AP 170a, may sense the primary channel. If the channel is detected to be busy, the STA may back off. Hence only one STA may transmit at any given time in a given BSS.

In IEEE 802.11n, high throughput (HT) STAs may also use a 40 MHz wide channel for communication. This may be achieved by combining the primary 20 MHz channel with an adjacent 20 MHz channel to form a 40 MHz wide contiguous channel.

In IEEE 802.11ac, very high throughput (VHT) STAs may support 20 MHz, 40 MHz, 80 MHz, and 160 MHz wide channels. The 40 MHz and 80 MHz channels may be formed by combining contiguous 20 MHz channels, similar to the IEEE 802.11n specification described above. A 160 MHz channel may be formed, either by combining 8 contiguous 20 MHz channels, or by combining two non-contiguous 80 MHz channels, which may be referred to as an 80+80 configuration. For the 80+80 configuration, the data, after channel encoding, may be passed through a segment parser that divides it into two streams. Inverse fast Fourier transform (IFFT) and time domain processing may be done on each stream separately. The streams may then be mapped on to the two channels, and the data may be transmitted. At the receiver, this mechanism may be reversed, and the combined data may be sent to the MAC.

Sub 1 GHz modes of operation may be supported by IEEE 802.11af and IEEE 802.11ah. For these specifications, the channel operating bandwidths and carriers may be reduced relative to those used in IEEE 802.11n and IEEE 802.11ac. The IEEE 802.11af specification may support 5 MHz, 10 MHz, and 20 MHz bandwidths in the TV white space (TVWS) spectrum. The IEEE 802.11ah specification may support 1 MHz, 2 MHz, 4 MHz, 8 MHz, and 16 MHz bandwidths using the non-TVWS spectrum. A possible use case for IEEE 802.11ah may be support for Meter Type Control (MTC) devices in a macro coverage area. MTC devices may have limited capabilities, including support only for limited bandwidths, but may also include a requirement for a very long battery life.

WLAN systems that support multiple channels and channel widths, such as IEEE 802.11n, IEEE 802.11ac, IEEE 802.11af, and IEEE 802.11ah, may include a channel which is designated as the primary channel. The primary channel may, but not necessarily, have a bandwidth equal to the largest common operating bandwidth supported by all STAs in the BSS. The bandwidth of the primary channel is therefore limited by the STA in a BSS that supports the smallest bandwidth operating mode. In the example of IEEE 802.11ah, the primary channel may be 1 MHz wide if there are STAs (e.g., MTC type devices) that only support a 1 MHz mode even if the AP and other STAs in the BSS support 2 MHz, 4 MHz, 8 MHz, 16 MHz, or other channel bandwidth operating modes. All carrier sensing and NAV settings may depend on the status of the primary channel. For example, if the primary channel is busy (e.g., due to a STA supporting only a 1 MHz operating mode transmitting to the AP) then the entire available frequency bands may be considered busy even though majority of it stays idle and available.

In the United States, the available frequency bands which may be used by IEEE 802.11ah are from 902 MHz to 928 MHz. In Korea, the available frequency bands are from 917.5 MHz to 923.5 MHz. In Japan, the available frequency bands are from 916.5 MHz to 927.5 MHz. The total bandwidth available for IEEE 802.11ah may be 6 MHz to 26 MHz depending on the country code.

In a wireless network, transmit power control (TPC) may be used for several reasons, including minimizing interference between nodes, improving wireless link quality, reducing energy consumption, controlling the topology, reducing interference with satellites/radar in 5 GHz mode, and improving coverage in the network.

Existing cellular standards may have different methods of implementing TPC. Conventional methods for TPC that may be used in wideband Code Division Multiple Access (WCDMA)/High Speed Packet Access (HSPA) are further disclosed herein. In WCDMA and HSPA, TPC may be a combination of open loop power control, outer loop power control, and inner loop power control. This may ensure that the power at the receiver in the uplink is equal for all WTRUs associated with a NodeB or base station. This may be important due to the near-far problem caused by the multiple access scheme of CDMA. As all the WTRUs utilize the entire spectrum, the received power of STAs far away from the base station may be overwhelmed by those close to the base station if the transmit power of the different WTRUs is not managed.

In open loop power control, which occurs between the WTRU and the radio network controller (RNC), each WTRU transmitter may set its output power to a specific value to compensate for path loss. This power control scheme may set the initial uplink and downlink transmission power when a WTRU is accessing the network.

In outer loop power control, which also occurs between the WTRU and the RNC, compensation may be made for long term channel variations. This power control scheme may be used to maintain the quality of communication at the level of bearer service quality requirement, while using as low a power as possible. Uplink outer loop power control may be responsible for setting a target signal to interference ratio (SIR) in the NodeB for each individual uplink inner loop power control. The target SIR may be updated for each WTRU according to the block error rate (BLER) or bit error rate (BER) for each RRC connection at a frequency of between 10 Hz and 100 Hz. Downlink outer loop power control may enable the WTRU to converge to required link quality (BLER) set by the network (RNC) in the downlink.

In inner loop power control (i.e., fast closed loop power control), which may occur between the WTRU and the Node B, each WTRU may compensate for short term channel variations. In the uplink, the WTRU may adjust, for example at 1500 Hz, its output power in accordance with one or more TPC commands received on a downlink signal from the base station. This may keep the received uplink SIR at a desired SIR target.

Conventional methods for TPC that may be used in uplink Universal Mobile Telecommunications System (UMTS) Long Term Evolution (LTE) are disclosed herein. In uplink LTE, power control may be a combination of a basic open loop TPC, a dynamic closed loop TPC, and a bandwidth factor compensation component. The effective transmit power may be calculated as:

$$Tx_{power} = P_0 + \alpha PL + \Delta_{TF} + f(\Delta_{TPC}) + 10 \log_{10} M. \quad \text{Equation (1)}$$

LTE may use Single-Carrier Frequency Division Multiple Access (SC-FDMA) in the uplink, so the need for tight power control may not be as important as in WCDMA/HSPA.

The basic open loop TPC may implement fractional power control in which the WTRU may compensate for a fraction of the path loss experienced, and may be calculated as:

$$Tx_{power} = P_0 + \alpha PL, \quad \text{Equation (2)}$$

where $\alpha$ may be the fractional path loss compensation parameter. The parameter, $P_0$ may be a WTRU specific offset component that enables the eNodeB to correct for systematic offsets in the WTRU's transmit power. The PL parameter may be the WTRU's estimate of the path loss derived from the received signal received power (RSRP) and the eNodeB transmit power. The fractional path loss compensation factor, $\alpha$, may trade off fairness for cell capacity. It is usually set between 0.7 and 0.8 and may reduce the effect of the cell edge transmissions, thereby increasing system capacity while minimizing the impact on cell edge performance. It may be used on the Physical Uplink Shared Channel (PUSCH). The Physical Uplink Control Channel (PUCCH) may set $\alpha=1$ and may have a different value of $P_0$.

Closed loop power control is dynamic and may perform a mixture of interference control with channel condition adaptation. Closed loop power control may use the terms:

$$\Delta_{TF} + f(\Delta_{TPC}). \quad \text{Equation (3)}$$

The parameter $\Delta_{TF}$ may be a modulation and coding scheme (MCS) dependent parameter that is based on the Shannon Capacity theorem. The WTRU specific parameter, $f(\Delta_{TPC})$, may be similar to the closed loop TPC term in WCDMA/HSPA and may instruct the WTRU to increase or decrease its power based on the power received at the eNB.

The bandwidth factor is a factor $10 \log_{10} M$ that scales the transmit power based on number of RBs actually scheduled.

TPC requirements for WLANs may be different from cellular for a number of reasons. In CDMA, both WTRUs close to the base transceiver station (BTA), and far away from the BTA, may be transmitting simultaneously. This may create a "near-far problem." With WLANs, since it is a time domain system, there is only one STA transmitting within a BSS at any given time. As such, tight closed loop power control may not be essential. Unlike in LTE, where there is a central scheduler controlling the multiple access algorithm, the primary multiple access algorithm in an 802.11 WLAN may be distributed in the distributed coordination function (DCF) or enhanced distribution channel access (EDCA) multiple access method. As such, the need to trade-off the fairness of the uplink scheduling of cell edge WTRUs against total cell capacity is not as high and explicit fractional path loss compensation may not be as important. In addition, there may be no Orthogonal Frequency Domain Multiple Access (OFDMA) and each STA/AP may occupy the entire bandwidth. As such, there may not be a need for a bandwidth factor. The IEEE 802.11 standards body emphasizes simplicity in algorithms, with receivers providing TPC recommendations and each transmitter deciding on its specific transmit power based on the manufacturer's own implementation concerns and regulatory requirements.

Accordingly, WLAN systems may specify different types of TPC procedures relative to the cellular-based TPC procedures. Conventional TPC procedures in the IEEE 802.11 WLAN specifications may support one or more of the following features: association of STAs with an AP in a BSS based on the STAs' power capability; peering of mesh STAs based on the mesh STAs' power capability; specification of regulatory, and local, maximum transmit power levels for a current channel; selection of a transmit power for each transmission in a channel within constraints imposed by regulatory and local requirements; and adaptation of transmit power based on several information elements (IEs), including path loss and link margin estimates.

Embodiments disclosed herein may include directional multi-gigabit WLAN transmissions as specified by IEEE 802.11ad using directional millimeter wave transmission. Hereinafter, WLAN transmissions governed by all other specifications including IEEE 802.11-2012, IEEE 802.11ac, IEEE 802.11af, and IEEE 802.11ah, may be defined as non-directional IEEE 802.11 WLAN transmissions.

In non-directional IEEE 802.11 WLAN transmission, the receiving STA may send out a TPC Report element that includes the transmit power and link margin. Link margin may be defined as the ratio of the received power to that required by the STA to close the link. The transmitter may use the information received in the TPC Report to decide on the transmit power. The STA may use any criteria to dynamically adapt the transmit power to another STA based on information it receives via feedback from STAs. Specific methods may be implementation dependent. This may be described as an open loop TPC. Open loop TPC implies the AP, or non-STA, transmitter may determine the transmit power independent of the STA's procedures.

A TPC report may be solicited by the receiver in which an explicit TPC request frame may be sent by the transmitter. Alternatively, a TPC Report may be unsolicited by, for example, an AP in a BSS or a STA in an IBSS.

Using directional multi-gigabit IEEE 802.11 WLAN transmission modes, for example IEEE 802.11ad, the directional multi-gigabit (DMG) link margin element may contain a field that recommends an increase or a decrease in transmit power. In this case, the transmitter may send a DMG link adaptation acknowledgement to indicate whether it will implement the recommendation or not.

Referring now to FIG. 2, open-Loop link margin in IEEE 802.11ah is disclosed. The IEEE 802.11ah specification has introduced a sub-1 GHz (S1G) open-loop link margin index for open loop link adaption and power control. FIG. 2 is a S1G open-loop link margin index element format 200, which may contain an Element ID 202, a length 204, and an Open-Loop Margin Index 206.

The open-loop link margin, $\Delta_{OPLM}$, may be defined as the summation of transmit power $P_{tx}$ and the receiver sensitivity $RX_{sensitivity}$, and may be defined as follows:

$$\Delta_{OPLM} = P_{tx} + RX_{sensitivity}. \qquad \text{Equation (4)}$$

The receiver sensitivity $RX_{sensitivity}$ may be the minimum required receive power for reception of MCS 10 for a 1 MHz channel. The open-loop link margin $\Delta_{OPLM}$ may be calculated as $(-128+D\times0.5)$ dB, where D may be the open-loop link margin index 206.

The S1G open-loop link margin index element 206 may be used for open-loop link adaptation and open-loop transmit power control. When a STA receives the open-loop link margin index 206, it may calculate the S1G open-loop link margin $\Delta_{OPLM}$ by using $(-128+D\times0.5)$ dB. The SNR margin over the MCS 10 may be derived by the STA that receives the frame containing the S1G open-loop link margin index 206. This may be based on the STA's own transmit power $P_{tx2}$ and the received signal strength indicator (RSSI) measured for the packet containing the S1G open-loop link margin index 206:

$$SNR_{margin} = P_{tx2} - \Delta_{OPLM} + RSSI. \qquad \text{Equation (5)}$$

Developments in multi-user (MU) transmission and power control are disclosed herein. The IEEE Standard board approved the IEEE 802.11ax Task Group (TGax) based on a Project Authorization Request (PAR) and Criteria for Standards Development (CSD) developed in the High Efficiency WLAN Study Group (HEW SG). MU transmissions, including both downlink and uplink transmissions, have been included in the TGax Specification Framework Document (SFD).

Referring now to FIG. 3, an example of a trigger frame format is shown. The trigger frame may not include power control information in the common info field. It has been proposed that the per-user info field of the trigger frame may include power control information, but details of this implementation have yet to be determined. The trigger frame may also support the allocation of resource units for random access. The trigger frame for random access may be referred to as TF-R and the proposed random access is similar to slotted Aloha. However, power control has not been disclosed.

Conventional technologies may include one or more of the following methods: multi-level power control and associated procedures, partially compensated power control and associated procedures, continuous closed loop power control and associated procedures, enabling multi-level power control in a transmit-receive session, Clear Channel Assessment (CCA) threshold modification for energy detection, coverage adjustment in interference limited networks, transmit power control for multiple channels/users and associated procedures, transmit power control for multi-AP transmissions and associated procedures, and power level initialization upon wakeup from power save mode and associated procedures.

In addition, conventional technologies may include one or more of the following methods: CCA adaptation with or without transit power control, utility function based transit power control with CCA adaptation, generalized transit power control with CCA adaptation, MCS-dependent TPC/CCA adaptation, and BSS-wide TPC/CCA adaptation.

The embodiments described herein may address one or more issues. One issue may be related to power control with uplink (UL) MU Transmissions. Simultaneous UL MU transmissions may require uplink power control. Without power control, the received power at the AP for multiple simultaneous uplink STAs may vary substantially. This may cause issues for reception at the AP including automatic gain control, IQ imbalance, frequency offset, and cascaded transmissions.

With regard to automatic gain control (AGC), an AP must maintain the total received power of reception from multiple STAs within the dynamic range of the AP's receiver front end. Without provisions to control the transmission power of the STAs, the dynamic range of the received power at the AP may exceed the capabilities of the receiver's front end.

Figure 4:
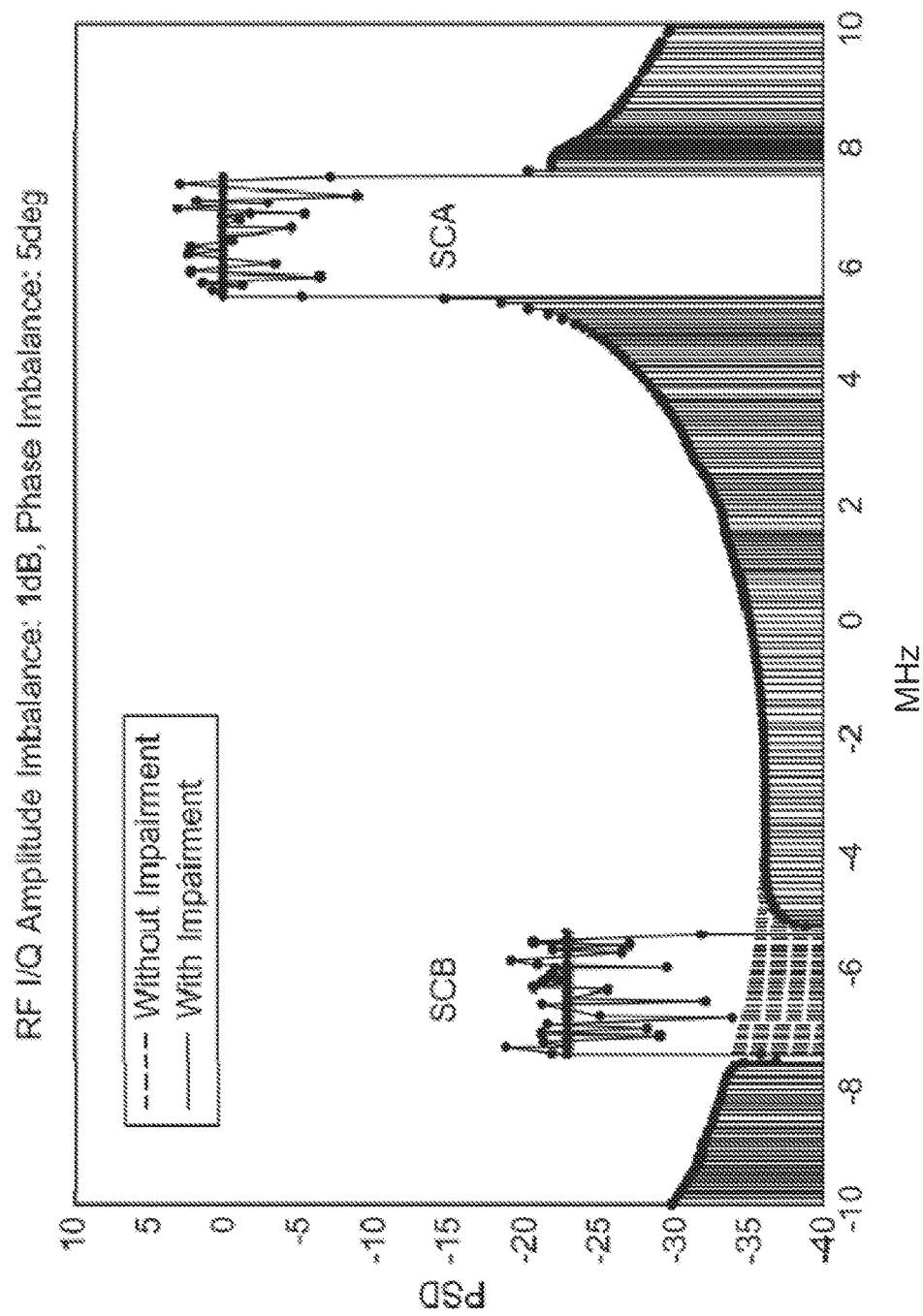
FIG. 4 is a frequency domain representation of mirror image distortion.

In-phase and quadrature (I/Q) component amplitude and phase imbalance on a signal transmitted over one sub-channel may create interference in a mirror image of its sub-channel. The severity of the distortion is dependent on the level of the I/Q amplitude and phase imbalance. FIG. 4 shows a frequency domain representation of mirror image distortion.

A frequency offset between signals transmitted on adjacent sub-channels may cause interference due to a loss of orthogonality. The level of interference may be further exacerbated by a power difference between the signals on the adjacent sub-channels.

Cascaded transmissions imply a dependence on UL transmissions to the recent state of DL transmissions. UL power control using this scheme may be dependent on information received from DL transmissions.

There may be problems associated with existing power control mechanisms defined in IEEE 802.11 specifications. For example, existing TPC procedures may be high level (semi-static) and normally performed, for example, in a beacon frame or association req/resp frames. Accordingly, TPC information may not be updated frequently. However, the received power, which may be a function of, for example, the physical channel and/or transmission bandwidth, may vary quickly. The outdated TPC information may not provide a power control that is accurate enough.

Another issue may be power control for large bandwidth transmissions. In large bandwidth transmissions, the different bands may need different TPC adjustment levels. Methods and procedures are needed to identify if there is a need for the different TPC adjustment levels and (a) obtain TPC levels and (b) send the TPC levels to the STAs.

Another issue may be power control calibration. In using an open loop TPC, an AP may need to calibrate a STAs response to a desired TP level. This may result an undesirable closed loop where the AP directs the STA to make changes based on the AP requirements.

Another issue may be transmit power control for fast moving STAs. In IEEE 802.11n and IEEE 802.11ac, the use of a TPC report does not take into consideration the Rx sensitivity of the receiver. The open loop link margin proposed in IEEE 802.11ah addresses this problem but assumes stationary low duty cycle transmitters. Accordingly, conventional use of open-loop link margin index is mainly for low-duty cycle sensor-type and meter-type devices which are mostly stationary. A STA whose position is changing quickly should avoid or be more conservative on using the open-loop link margin index. Including open-loop link margin index may be optional in beacon or other management frames. A new TPC report may be needed for fast moving STAs to take into account Rx sensitivity.

As discussed in more detail below, power control methods and procedures for UL random access may be provided. UL MU random access transmissions may be synchronized and scheduled by a trigger frame. The TPC procedure for random access, which may be performed using the frame exchanges between AP and STAs, may be a mainly open-loop based procedure. This may be because the AP may not know who may transmit using the UL MU random access time slot. In the case where an AP may limit the access to the UL MU random access, some level of closed-loop TPC procedure may be applied jointly with the open-loop TPC.

In an embodiment, a TPC procedure applicable to general UL MU random access may be provided. In another embodiment, procedures and methods are described for the case where the AP may restrict the UL MU random access by one or more different criteria, which may ease the MU TPC. It should be noted that the methods and procedures provided with respect to this embodiment may be applied to any MU power control schemes and should not be restricted to UL random access.

Figure 5:
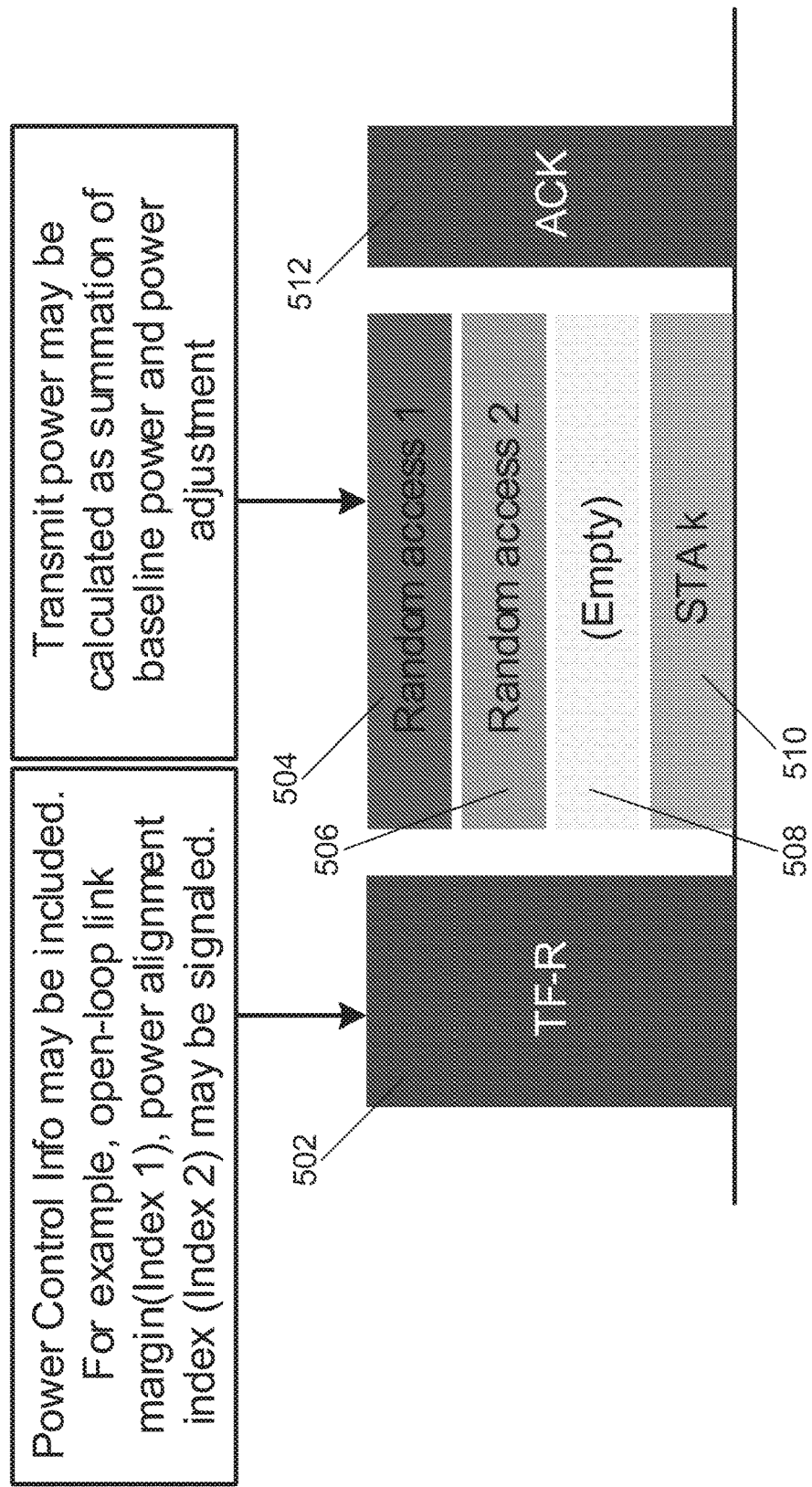
FIG. 5 is a diagram illustrating transmit frames exchanged during an exemplary transmit power control (TPC) procedure for random access
Figure 6:
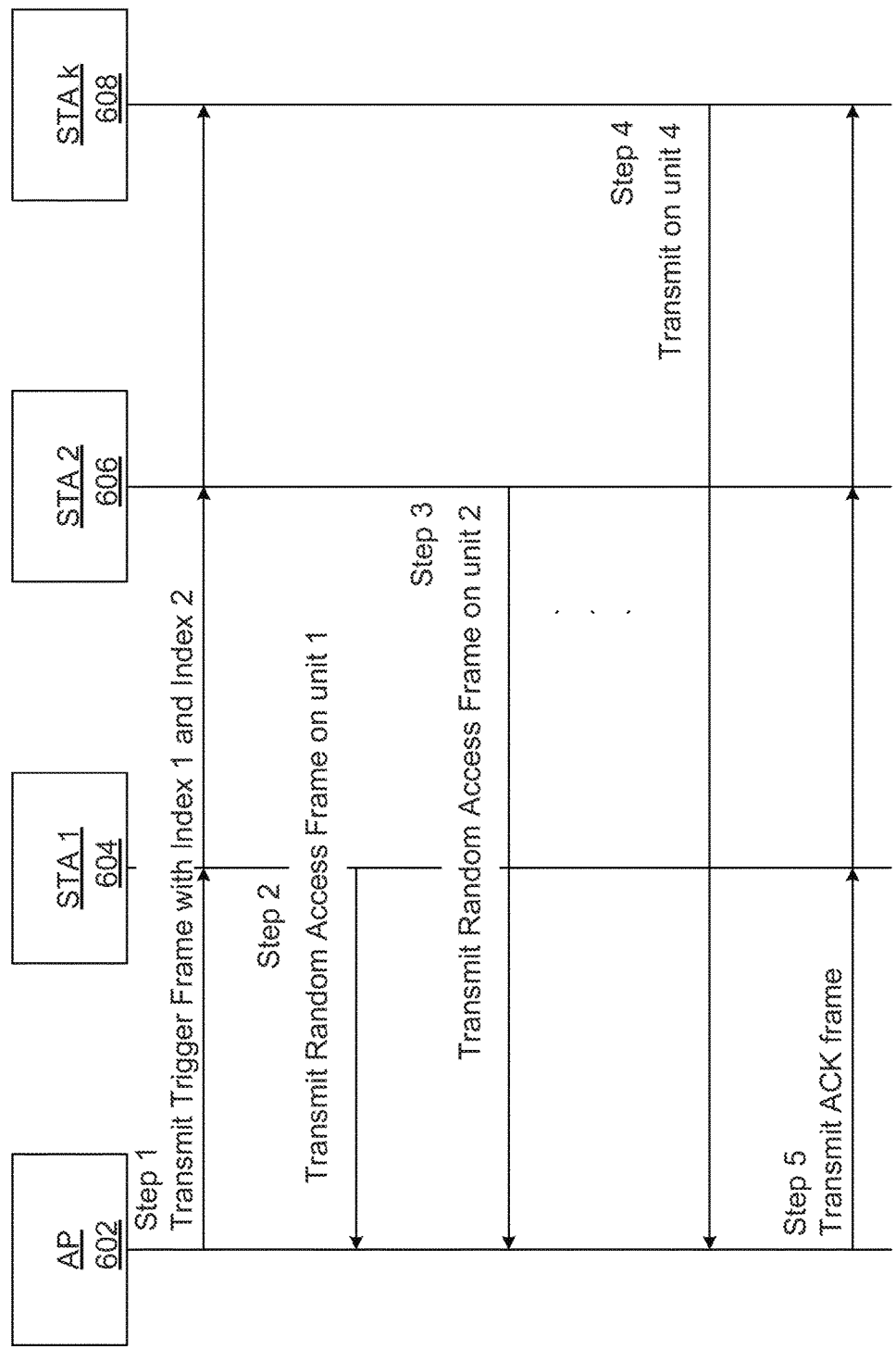
FIG. 6 is a diagram illustrating steps of the exemplary TPC procedure for random access.

Referring to FIGS. 5 and 6, diagrams illustrating TPC procedures with UL MU random access are shown. In this embodiment, the following transmit power control concepts may be included. A baseline transmit (Tx) power may be calculated at the non-AP STAs side as a baseline to set up the uplink transmit power. The calculation of the baseline Tx power may be based on open-loop, closed-loop or combined open-loop/closed-loop power control procedure. In addition, a Tx Power adjustment value may be used for finer Tx power adjustment.

Using UL MU random access STAs may access the WLAN system even before an association is triggered by a trigger frame. STAs that intend to transmit an UL frame may randomly pick one or more OFDMA resource units following the instruction of trigger frame. An OFDMA resource unit is the basic resource unit which may be assigned to a STA, for example, an OFDMA RU in the IEEE 802.11ax system. The trigger frame may allow both dedicated transmissions and random access transmissions simultaneously. In the embodiments described herein, at least one OFDMA resource unit may be assigned for random access.

The STAs that transmit after the trigger frame may utilize the TPC procedure disclosed herein. FIGS. 5 and 6 show an exemplary procedure for random access with power control. In this example, an AP 602 may have acquired the channel with 4 OFDMA resource units. In a DL trigger frame 502 sent in Step 1, the AP 602 may indicate OFDMA resource units 1 to 3 may be used for UL MU random access, while the 4th OFDMA resource unit may be assigned to STA k 608. In Steps 2 and 3, and a short interframe space (SIFS) time after the end of the trigger frame 502, a first STA 604 and a second STA 606 may transmit their random access frames on resource units 504 and 506 respectively. No STA may transmit on resource unit 508. In Step 4, STA k 608 may transmit on resource unit 510. Subsequently, in Step 5, the AP 602 may send an acknowledgement (ACK) frame 512 of the UL MU transmission.

Actions performed on the AP side in the above TPC procedure may be described herein. The AP 602 may acquire the channel medium either through contention or scheduling. In Step 1, the AP 602 may transmit the trigger frame 502 through at least one transmit circuit coupled to at least one antenna. The trigger frame 502 may include allocation of at least one OFDMA resource unit for random access in the upcoming UL OFDMA transmission. The trigger frame 502 may be transmitted with one or more of the methods disclosed herein.

The trigger frame 502 may be transmitted as a standalone frame as shown in FIG. 5. The DL transmission of the trigger frame 502 may be in OFDM mode. The trigger frame 502, as a MAC frame, may be aggregated with other frames including data frames, control frames, and management frames using an aggregated mac protocol data unit (A-MPDU) format. The transmission may be in OFDM mode, OFDMA mode, or another MU mode. The AP 602 may transmit the trigger frame 502 and other frames including data frames, control frames, and management frames, in a MU mode, for example, DL OFDMA or another MU mode. If the trigger frame 502 is transmitted in DL OFDMA mode, the resource allocation field in signal field B (SIG-B) of the trigger frame 502 may use a reserved broadcast or multicast identifier (ID) to indicate the corresponding OFDMA resource units are assigned for trigger frame 502 transmission. A broadcast or multicast ID utilized in SIG-B field may indicate that all the STAs 604, 606, 608 may need to monitor and decode the information carried on the resource units.

The AP 602 may include the open-loop power control index (index 1) in the trigger frame 502. In one method, the open-loop link margin index may be defined in an similar way as it is in IEEE 802.11ah, which may be as follows:

$$\Delta_{OPLM} = P_{tx} + RX_{sensitivity}.$$  Equation (6)

However, the receiver sensitivity $RX_{sensitivity}$ may be redefined as the minimum required receive power for reception of the lowest MCS for the basic channel bandwidth. For example, with IEEE 802.11ax, it may refer to 20 MHz or another bandwidth. This may be standardized, such that STAs 602, 606, 608 may know the definition explicitly. The open-loop link margin $\Delta_{OPLM}$ may be calculated as (−128+ D×G) dB, where D may be the open-loop link margin index and G may be the basic granularity. For example, G=0.25 or 0.5.

The AP 602 may include a power alignment index (index 2) in the trigger frame 502. This power alignment index may be a targeted link margin or may be receive power expected at the AP side. In the case of UL MU transmissions, the STAs 604, 606, 608 may try to reach the AP 602 using the targeted power level.

The AP 602 may include user specific power adjustment parameters in trigger frame 502. For the resource units assigned to random access STAs, the power adjustment parameters may be the same among the random access STAs. The power adjustment parameters may or may not be the same for all the recipients of the trigger frame 502.

After SIFS time, and shown in Steps 2-4, the AP 602 may receive UL transmissions from multiple STAs 604, 606, 608 by at least one receive circuit coupled to at least one antenna. The STAs 604, 606, 608 may adjust their transmit power according to baseline transmit power and transmit power adjustment values received in the preceding trigger frame 502. On each OFDMA resource unit assigned for random access, the AP 602 may receive one random access packet from a STA 604, 606, 608 successfully, multiple random access packets from multiple STAs 604, 606, 608, which may result in collisions on the particular OFDMA resource unit, or no packet on this particular OFDMA resource unit. On OFDMA resource units assigned to dedicated STAs 604, 606, 608, the AP 602 may receive the data, control, or management frames from the assigned STAs 604, 606, 608.

In Step 5, and SIFS time after the reception of UL MU transmissions, the AP 602 may transmit a multi-STA acknowledgement frame or block ACK frames to the STAs 604, 606, 608.

Actions performed on the STA side in the above TPC procedure may be described herein. In Step 1, the STAs 604, 606, 608 may detect the trigger frame 502 through at least one receive circuit coupled to at least one antenna. The trigger frame 502 may assign at least one OFDMA resource unit for UL MU random access in the upcoming UL OFDMA transmission. In the case that the DL transmission from the AP 602 is in OFDMA mode, the STAs 604, 606, 608 may check the SIG-B field for resource allocation for the trigger frame 502. The STAs 604, and 606 may prepare for the transmission in the assigned UL MU random access resource using at least one transmit circuit coupled to at least one antenna if the first STA 604 and the second STA 606 have an uplink control, management, or data frame to transmit. In addition, the first STA 604 and the second STA 606 may prepare for the transmission if the first STA 604 and the second STA 606 qualify for the requirements of random access, if any, in the trigger frame 502. In Steps 2 and 3, the first STA 604 and the second STA 606 may transmit in the assigned UL MU random access resources using at least one transmit circuit coupled to at least one antenna. The STA k 608 may prepare for the transmission if the STA k 608 is not assigned dedicated OFDMA resource units, or a transmission opportunity by the AP 602 for the upcoming UL transmission. In Step 4, the STA k 608 may transmit.

In the case that the first STA 604 and the second STA 606 transmit in one or more of the assigned random access resource units following the UL MU random access protocol, padding schemes may be applied to the uplink transmission, such that transmissions from multiple users may complete at the same time or roughly the same time.

The STAs 604, 606, 608 may set the transmit power according to the methods disclosed herein. The STA 604, 606, 608 may check the value of index 1, carried in the trigger frame 502. The STA 604, 606, 608 may check the value of index 2, carried in the trigger frame 502. The STA 604, 606, 608 may calculate the baseline transmit power based on index 1 and index 2. The STA 604, 606, 608 may check the power adjustment parameter carried in the trigger frame 502, and increase or decrease baseline transmit power accordingly.

If the STA 604, 606, 608 has communicated with the AP 602 previously (e.g., within a certain time period), the STA 604, 606, 608 may have a record of historical transmit power control related parameters. The STA 604, 606, 608 may weigh one or more of the historical transmit power control related parameters and combine them with the instantaneous transmit power acquired from any one or more of the values or parameters received in the trigger frame 502.

The STA 604, 606, 608 may adjust the calculated transmit power according to transmit bandwidth and antenna settings. The STA 604, 606, 608 may confirm that the calculated transmit power does not violate the maximum allowed transmit power and transmit power density. Otherwise, the STA 604, 606, 608 may use the maximum allowed transmit power instead.

SIFS time after the transmission, the STA 604, 606, 608 may receive an acknowledgement frame from the AP 602.

In an embodiment, the trigger frame 502 may include both index 1 and index 2. In another embodiment, the trigger frame 502 may include index 2 but not index 1. Instead, the AP 602 may broadcast index 1 in a beacon frame. A STA 604, 606, 608 may need to detect at least one beacon frame before the trigger frame 502, which may initiate the uplink random access from the STA 604, 606, 608. In this scenario, the trigger frame 502 may be transmitted with the transmit power used to calculate index 1. Thus, the STA 604, 606, 608 may measure the received power of the trigger frame 502 and calculate the baseline transmit power accordingly. In another embodiment, the trigger frame 502 may include neither index 1 nor index 2. Instead, the AP 602 may broadcast index 1 in the beacon frame.

The TPC procedures described above may apply to an UL data portion. However, it should be noted that these procedures may also be applied to an UL preamble portion with scalers. A legacy preamble and a high efficiency (HE) preamble may use different scalers.

Methods and procedures to set baseline transmit power are disclosed herein. With UL random access, the AP 602 may not know which STAs 604, 606, 608 may transmit at which time. Accordingly, it may be difficult for the AP 602 to adjust the transmit power for the STAs 604, 606, 608. Instead, the AP 602 may broadcast necessary information for a STA 604, 606, 608 to set up the baseline transmit power.

This may allow for the received power at the AP 602 side to be aligned in the upcoming UL MU transmission time slot. The baseline power setting may be an open-loop procedure which involves a DL transmission for the non-AP STAs 604, 606, 608 to measure the received power and set the transmit power.

In the DL transmission, two power control related parameters may be included and broadcast to the STAs 604, 606, 608. An open-loop power control index, index 1, may be calculated according to, for example, transmit power at the AP 602 side, transmit/receive antenna gain at the AP 602 side, necessary bandwidth information for a DL transmission, and/or cable and connector loss. According to this index, the receiver may estimate the pathloss between the STA 604, 606, 608 and the AP 602 and the expected receive power level at the AP 602 side given a certain STA 604, 606, 608 transmit power.

The AP 602 may set up a power alignment index, index 2, which may be used by multiple STAs 604, 606, 608 to align the received power at the AP 602 side. This index may be the expected received power or link margin at the AP 602 side for UL MU transmission. For example, according to index 1, the first STA 604 may expect a received power at the AP 602 side of $P_{rx\_1}$ if it transmits with power $P_{tx\_1}$. While the second STA 606 may expect a received power at the AP 602 side of $P_{rx\_2}$ if it transmits with power $P_{tx\_2}$. According to index 2, both the first STA 604 and the second STA 606 may notice that the AP 602 may expect the received power as C. The first STA 604 may adjust its transmit power as $P_{tx\_1}-(P_{rx\_1}-C)$, and similarly, the second STA 606 may adjust its transmit power as $P_{tx\_2}-(P_{rx\_2}-C)$.

Several examples are disclosed to set the open-loop power control index (index 1) and power alignment index (index 2). In addition, detailed link budget calculation for multi-user transmissions may be formulated below.

Figure 7:
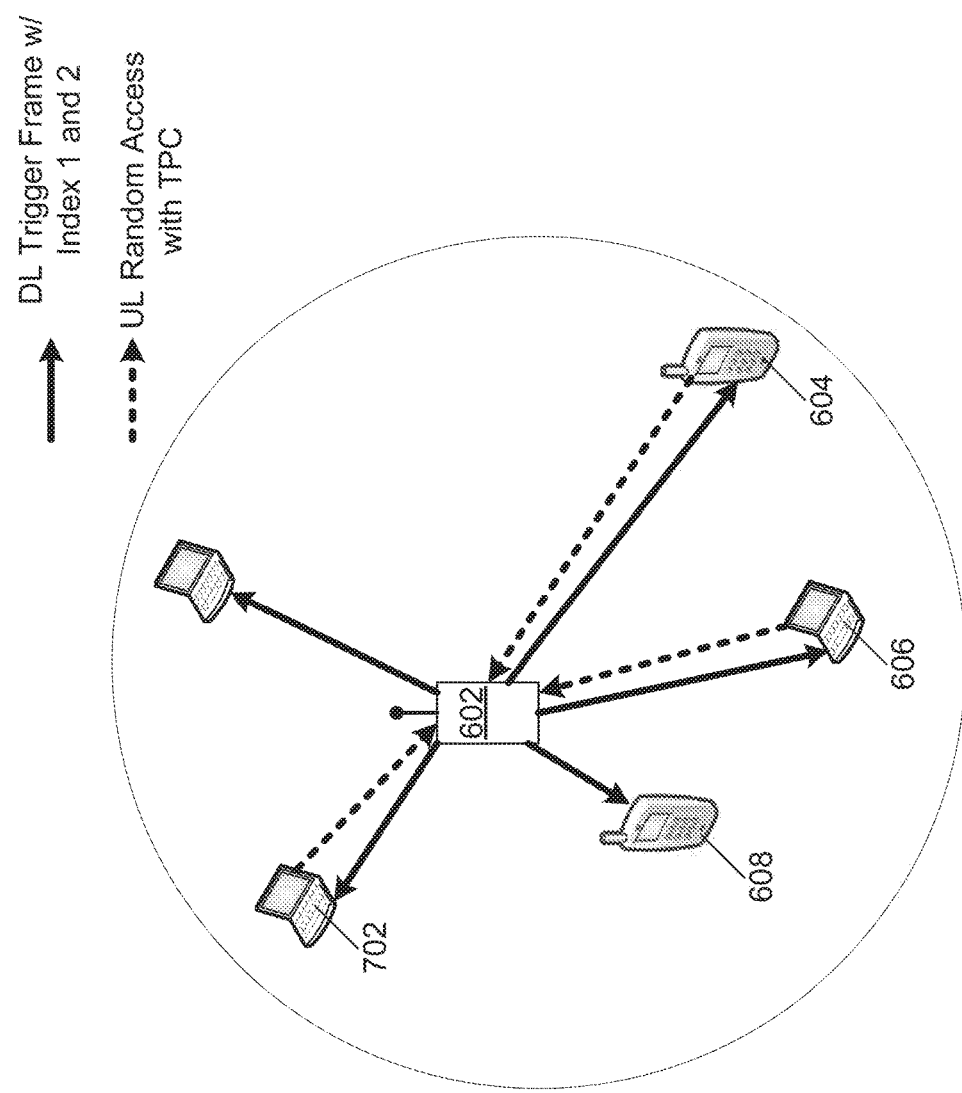
FIG. 7 is a network diagram which shows transmit power control (TPC) information carried in the DL trigger frame whereby stations (STAs) may set the transmit power accordingly in the following UL random access transmission.

Referring to FIG. 7, a diagram illustrating the transmission of TPC information, index 1, and index 2 and the setting of transmit power by one or more STAs. In an embodiment, the AP 602 may transmit the TPC information, index 1, and index 2 in a DL trigger frame to at least STAs 604, 606, 608. The STAs 604, 606, 608 may set the transmit power accordingly in the following UL random access transmission.

As shown in FIG. 7, the AP 602 may broadcast a trigger frame which allocates at least one OFDMA resource unit for UL random access. Index 1 and index 2 may be indicated in the trigger frame. In an alternative method, index 2 may not be included and a default index 2 may be specified or negotiated between the AP 602 and one or more of the STAs 604, 606, 608 separately. When measuring the received power of the DL trigger frame, a $k^{th}$ STA 702 may estimate the path loss (PL) between the AP 602 and the $k^{th}$ STA 702 as the following:

$$PL_k = P_{tx\_ap} + AP_{tx\_antenna\_gain} + STA_{rx\_antenna\_gain\_k} - P_{rx\_sta\_k}, \quad \text{Equation (7)}$$

where $P_{tx\_ap}$ is the transmit power at the AP 602 side, $AP_{tx\_antenna\_gain}$ is the antenna gain at the AP 602 side, $STA_{rx\_antenna\_gain\_k}$ is the antenna gain at the $k^{th}$ STA 702 side, and $P_{rx\_sta\_k}$ is the received power at the $k^{th}$ STA 702 side.

It should be noted that losses, such as cable loss and connector loss, are not considered in Equation (7). However, in the case that they may need to be considered, it may be assumed that they are included in the antenna gain parameters. For example, $AP_{tx\_antenna\_gain}$ may be interpreted as $AP_{tx\_antenna\_gain} - AP_{tx\_cable\_loss}$. Similarly, $STA_{rx\_antenna\_gain\_k}$ may be interpreted as $STA_{rx\_antenna\_gain\_k} - STA_{rx\_cable\_loss\_k}$.

It may be assumed that the AP 602 is transmitting on a channel with bandwidth M_DL corresponding to N_DL subcarriers, while the $k^{th}$ STA 702 may perform the received power measurement on the same channel bandwidth.

In the next time slot, if the $k^{th}$ STA 702 transmits on one or more OFDMA resource units with bandwidth M_UL corresponding to N_UL subcarriers, the expected received power at the AP 602 side may be expressed below:

$$\begin{aligned} P_{rx\_ap\_k} &= \\ P_{tx\_sta\_k} &+ STA_{tx\_antenna\_gain\_k} + AP_{rx\_antenna\_gain} - \\ PL_k &= P_{tx\_sta\_k} + STA_{tx\_antenna\_gain\_k} + \\ AP_{rx\_antenna\_gain} &- (P_{tx\_ap} + AP_{tx\_antenna\_gain} + \\ STA_{rx\_antenna\_gain\_k} &- P_{rx\_sta\_k}) = \\ (P_{tx\_sta\_k} &+ P_{rx\_sta\_k} + STA_{tx\_antenna\_gain\_k} - \\ STA_{rx\_antenna\_k}) &+ (AP_{rx\_antenna\_gain} - \\ AP_{tx\_antenna\_gain} &- P_{tx\_ap}) = A + B, \end{aligned} \quad \text{Equation (8)}$$

where $$A = P_{tx\_sta\_k} + P_{rx\_sta\_k} + STA_{tx\_antenna\_gain\_k} - STA_{rx\_antenna\_k} \quad \text{Equation (9)}$$

and $$B = -P_{tx\_ap} + AP_{rx\_antenna\_gain} - AP_{tx\_antenna\_gain}. \quad \text{Equation (10)}$$

As listed, $P_{tx\_sta\_k}$ may be the transmit power at the $k^{th}$ STA 702, $P_{rx\_sta\_k}$ may be the received power at the $k^{th}$ STA 702, $STA_{tx\_antenna\_gain\_k}$ may be the transmit antenna gain at the $k^{th}$ STA 702 side, and $STA_{rx\_antenna\_k}$ may be the receive antenna gain at the $k^{th}$ STA 702 side. $P_{tx\_ap}$ may be the transmit power at the AP 602 side, $AP_{rx\_antenna\_gain}$ may be the receive antenna gain at the AP 602 side, and $AP_{tx\_antenna\_gain}$ may be the transmit antenna gain at the AP 602 side.

The expected link margin at the STA side may be:

$$LM_{ap\_k} = P_{rx\_ap\_k} - \text{sensitivity}_{ap} = A + (B - \text{sensitivity}_{ap}), \quad \text{Equation (11)}$$

where sensitivity$_{ap}$ may be the sensitivity at the AP 602 side. The value of A may be known at the $k^{th}$ STA 702 side while the value of B may be known at the AP 602 side. In the case that the AP 602 may broadcast a desired received power, index 2, for the STAs 604, 606, 608, 702 to reach, the $k^{th}$ STA 702 side may need to know values of both A and B. In other words, the AP 602 may include B or relevant information as index 1 in the DL transmission. Alternatively, if the AP 602 may broadcast a desired link margin (index 2) for the 604, 606, 608, 702 to reach, the AP 602 may include B−sensitivity$_{ap}$ or relevant information as index 1 in the DL transmission.

The values $P_{tx\_ap}$ and $P_{rx\_sta\_k}$ may be power transmitted or measured over the same bandwidth, which may be the DL transmission bandwidth.

In the case that at the AP 602 side, transmit antenna gain and receive antenna gain are the same or the system may assume them the same, B may be simplified as:

$$B = -P_{tx\_ap} \quad \text{Equation (12)}$$

In the case that at the $k^{th}$ STA 702 side, transmit antenna gain and receive antenna gain are the same or the system may assume them the same, A may be simplified as:

$$A = P_{tx\_sta\_k} + P_{rx\_sta\_k} \quad \text{Equation (13)}$$

There may be different ways to set index 1 and index 2. In an embodiment, index 1 and index 2 may be set up based on power. For example, index 1 may be set based on value B defined in Equation (10) or Equation (12). Index 2 may be the expected received power or link margin. With OFDMA transmission, the DL and UL transmission bandwidth may not be the same, thus BW adjustment may be applied.

In an embodiment, the AP 602 may have an asymmetric transmit and receive antenna setting. Index 1 may be a quantized version of $B=-P_{tx\_ap}+AP_{rx\_antenna\_gain}-AP_{tx\_antenna\_gain}$ in units of decibels relative to 1 mW. The detailed definition of $P_{tx\_ap}$ may be the transmit power used to transmit the frame containing index 1. The AP 602 may include the transmit bandwidth in the PLCP header, and the $P_{tx\_ap}$ may be the transmit power over the entire band. $P_{tx\_ap}$ may be the transmit power per subcarrier used to transmit the frame containing index 1. $P_{tx\_ap}$ may be the equivalent transmit power used to transmit the frame containing index 1 for a basic bandwidth. The basic bandwidth may be defined as a mandatorily supported bandwidth. For example, the basic bandwidth may be 20 MHz while the AP 602 may transmit on a 40 MHz channel. Then the $P_{tx\_ap}$ may be the transmit power on the 20 MHz basic channel, which may be 3 dB less than the total transmit power on the 40 MHz channel.

Index 2 may be a quantized version or a function of the desired received power C measured in units of decibels relative to 1 mW. The variable C may be the desired received power over the expected total bandwidth, with N_total subcarriers, for the upcoming UL MU transmissions no matter whether the bandwidth of the UL transmission is narrower than or the same as the expected bandwidth from the AP 602. For example, the AP 602 may reserve an 80 MHz channel for the upcoming UL MU transmissions. The AP 602 may allocate some OFDMA resource units for UL MU random access transmissions. Thus, some of the OFDMA resource units may not be selected by any STAs 604, 606, 608, 702 and this may make the real UL transmission bandwidth less than 80 MHz. However the C in this example may be the desired received power over the 80 MHz channel but not the bandwidth utilized in UL MU transmission.

The variable C may be the desired received power over a basic bandwidth (with N_basic subcarriers) which may not be relevant to upcoming UL MU transmission bandwidth. The basic bandwidth may be defined as a mandatory supported bandwidth. For example, the basic bandwidth may be 20 MHz. This basic bandwidth may be specified in the standard or negotiated between the AP 602 and all the STAs 604, 606, 608, 702 before this transmission. In one method, the AP 602 may broadcast it in a beacon frame.

The variable C may be the desired received power over the smallest OFDMA resource unit with N_unit subcarriers, which may not be relevant to an upcoming UL MU transmission bandwidth.

The variable C may be the desired received power over a subcarrier which may not be relevant to an upcoming UL MU transmission bandwidth.

The $k^{th}$ STA 702, as a receiver of both index 1 and index 2, may set its baseline transmit power on one or more OFDMA resource units with N subcarriers using procedures disclosed herein. The $k^{th}$ STA 702 may obtain the value B from index 1. The $k^{th}$ STA 702 may obtain the value C from index 2. The baseline transmit power, measured in units of decibels relative to 1 mW, of this STA may be:

$$P_{baseline\_k}=C-B-P_{rx\_sta\_k}-(STA_{tx\_antenna\_gain\_k}-STA_{rx\_antenna\_gain\_k})-10\log_{10}M+10\log_{10}N \quad \text{Equation (14)}$$

In Equation (14), N may be the bandwidth or number of subcarriers of the $k^{th}$ STA 702 utilized for UL transmission. M may be the bandwidth or number of subcarriers of index 2. In the case where C may be the desired received power over the expected total bandwidth, M=N_total. In the case where C may be the desired received power over a basic bandwidth, M=N_basic. In the case where C may be the desired received power over the smallest OFDMA resource unit, M=N_unit. In the case where C may be the desired received power over a subcarrier which may not be relevant to upcoming UL MU transmission bandwidth, M=1. In the case that the transmit antenna gain and receive antenna gain at the STA side may be the same or may be considered the same, Equation (14) may be simplified as shown in Equation (15).

$$P_{baseline\_k}=C-B-P_{rx\_sta\_k}-10\log_{10}M+10\log_{10}N \quad \text{Equation (15)}$$

In an embodiment, an AP 602 may have symmetric transmit and receive antenna setting. This embodiment may be similar to the method disclosed for the asymmetric transmit and receive antenna setting, except that it may be assumed that transmit antenna gain and receive antenna gain at the AP 602 side may be the same or considered the same. In this case, index 1 may be quantized version of:

$$B=-P_{tx\_ap} \quad \text{Equation (16)}$$

The variable B may be in units of decibels relative to 1 mW. The baseline power calculation may follow Equation (14) or Equation (15) where value B may be substituted by Equation (16).

In another embodiment, index 1 and index 2 may be set up based on link margin (LM), which is the difference between the received power and receiver sensitivity and may be defined as follows:

$$LM_{ap}=P_{rx\_ap\_k}-\text{sensitivity}_{ap} \quad \text{Equation (17)}$$

Sensitivity$_{ap}$ may be the receiver sensitivity at the AP 602 side. Index 1 may be set as value B minus some level of receiver sensitivity, while index 2 may be the expected link margin at the AP 602 side. The receiver sensitivity may be a function of MCS level and channel bandwidth. In an OFDMA system, different OFDMA resource unit sizes may have an impact on the sensitivity value as well. Detailed methods and procedures are disclosed herein.

In an embodiment where the AP may have asymmetric transmit and receive antenna setting, index 1 may be a quantized version of:

$$B_1 = B - \text{sensitivity}_{ap} = -P_{tx\_ap} - \text{sensitivity}_{ap} + AP_{rx\_antenna\_gain} - AP_{tx\_antenna\_gain} \quad \text{Equation (18)}$$

in units of decibels. Alternatively, index 1 may be a function of $B_1$. The detailed definition of $P_{tx\_ap}$ and sensitivity$_{ap}$ may be one or more of the definitions disclosed herein. $P_{tx\_ap}$ may be the transmit power used to transmit the frame containing index 1. The AP 602 may include the transmit bandwidth in the PLCP header, and the $P_{tx\_ap}$ may be the transmit power over the entire band. $P_{tx\_ap}$ may be the transmit power per subcarrier used to transmit the frame containing index 1. $P_{tx\_ap}$ may be the equivalent transmit power used to transmit the frame containing index 1 for a basic bandwidth. The basic bandwidth may be defined as a mandatory supported bandwidth. For example, the basic bandwidth may be 20 MHz. The sensitivity$_{ap}$ may be a minimum required receive power for reception of the lowest MCS for the bandwidth used to transmit the frame containing index 1. The sensitivity$_{ap}$ may be a minimum required receive power for reception of the lowest MCS for a subcarrier. The sensitivity$_{ap}$ may be a minimum required receive power for reception of the lowest MCS for a basic bandwidth. The basic bandwidth may be defined as a mandatorily supported bandwidth. For example, the basic bandwidth may be 20 MHz.

Index 2 may be a quantized version of the desired receiver link margin with value $C_1$ in units of decibels relative to 1 mW. Alternatively, index 2 may be a function of $C_1$. The detailed definition of $C_1$ may be any one of the definitions disclosed herein. $C_1$ may be the desired link margin over the expected total bandwidth, with N_total subcarriers, for the upcoming UL MU transmissions even if the bandwidth of the UL transmission is narrower than, or the same, as the expected bandwidth from the AP 602.

For example, the AP 602 may reserve an 80 MHz channel for the upcoming UL MU transmissions. The AP 602 may allocate some OFDMA resource units for UL MU random access transmissions. Thus, some of the OFDMA resource units may not be selected by any STAs 604, 606, 608, 702 and this may make the real UL transmission bandwidth less than 80 MHz. However, the $C_1$ in this example may be the desired received power over the 80 MHz channel but not the bandwidth utilized in UL MU transmission.

$C_1$ may be the desired link margin over a basic bandwidth, with N_basic subcarriers, which may not be relevant to upcoming UL MU transmission bandwidth. The basic bandwidth may be defined as a mandatory supported bandwidth. For example, the basic bandwidth may be 20 MHz. This basic bandwidth may be standardized, broadcast by the AP 602 before this transmission, for example, in a beacon frame, or negotiated between the AP 602 and all the STAs 604, 606, 608, 702 before this transmission. $C_1$ may be the desired link margin over the smallest OFDMA resource unit, with N_unit subcarriers, which may not be relevant to upcoming UL MU transmission bandwidth. Alternatively, $C_1$ may be the desired link margin over a subcarrier which may not be relevant to upcoming UL MU transmission bandwidth.

The k$^{th}$ STA 702, upon receiving both index 1 and index 2, may set its baseline transmit power on one or more OFDMA resource units, with N subcarriers, using a procedure disclosed herein. The k$^{th}$ STA 702 may obtain value $B_1$ from index 1. The k$^{th}$ STA 702 may obtain value $C_1$ from index 2. The transmit power in units of decibels relative to 1 mW of the k$^{th}$ STA 702 may be calculated as:

$$P_{baseline\_k}=C_1-B_1-P_{rx\_sta\_k}-(STA_{tx\_antenna\_gain\_k}-STA_{rx\_antenna\_gain\_k})-10\log_{10}M+10\log_{10}N \quad \text{Equation (19)}$$

In Equation (19), N may be the bandwidth or number of subcarriers utilized by the k$^{th}$ STA 702 for UL transmissions. M may be the bandwidth or number of subcarriers of index 2. In the case where $C_1$ may be the desired link margin over the expected total bandwidth (with N_total subcarriers) for the upcoming UL MU transmissions even if the bandwidth of the UL transmission is narrower than or the same as the expected bandwidth from the AP 602, M=N_total. In the case where $C_1$ may be the desired link margin over a basic bandwidth (with N_basic subcarriers) which may not be relevant to upcoming UL MU transmission bandwidth, M=N_basic. In the case where $C_1$ may be the desired link margin over the smallest OFDMA resource unit (with N_unit subcarriers) that may not be relevant to upcoming UL MU transmission bandwidth, M=N_unit. In the case where $C_1$ may be the desired link margin over a subcarrier that may not be relevant to upcoming UL MU transmission bandwidth, M=1.

In the case that the transmit antenna gain and receive antenna gain at the k$^{th}$ STA 702 side may be the same or may be considered the same, Equation (19) may be simplified as:

$$P_{baseline\_k}=C_1-B_1-P_{rx\_sta\_k}-10\log_{10}M+10\log_{10}N. \quad \text{Equation (20)}$$

In an embodiment, the AP 602 may have symmetric transmit and receive antenna setting. This may be similar to the embodiment involving an asymmetric transmit and receive antenna setting, except that it may be assumed that transmit antenna gain and receive antenna gain at the AP 602 side may be the same or considered the same. In this case, index 1 may be quantized version of:

$$B_1=-P_{tx\_ap}-\text{sensitivity}_{ap} \quad \text{Equation (21)}$$

in units of decibels. The baseline transmit power calculation may follow Equation (19) or Equation (20) where value B may be substituted by Equation (21). It should be noted that Equation (21) is negative to the open-loop link margin. Thus with this method, open-loop link margin may be used as index 1 too, and Equation (19) and Equation (20) may be modified slightly to consider the negative sign.

Methods and procedures to set power adjustment are disclosed herein. A power adjustment parameter may be set as an integer or a fraction in units of decibels, denoted as D. Alternatively, the power adjustment parameter may be a function of D. The value D may be set using a default value if the AP 602 does not have any power control related records for a STA or if the AP 602 does not know which STAs may transmit, for example, UL MU random access. The value D may be increased if the number of retries is increased. For example, the AP 602 may trigger the STAs 604, 606, 608, 702 to retransmit using random access.

TPC procedures with restricted UL MU random access are disclosed herein. Considering FIGS. 5-7, where an UL MU random access procedure is initiated by a trigger frame, procedures are disclosed which allow a STA, for example, the first STA 604, to determine whether it is a candidate of the UL MU random access opportunity. One of such procedures may include power control information in the trigger frame that the first STA 604 may use to determine if it is a candidate of the UL MU random access opportunity. The power control information may indicate a range of allowable received power at the first STA 604, and/or a link margin for the first STA 604 to be able to join. This is illustrated in FIG. 8.

Figure 8:
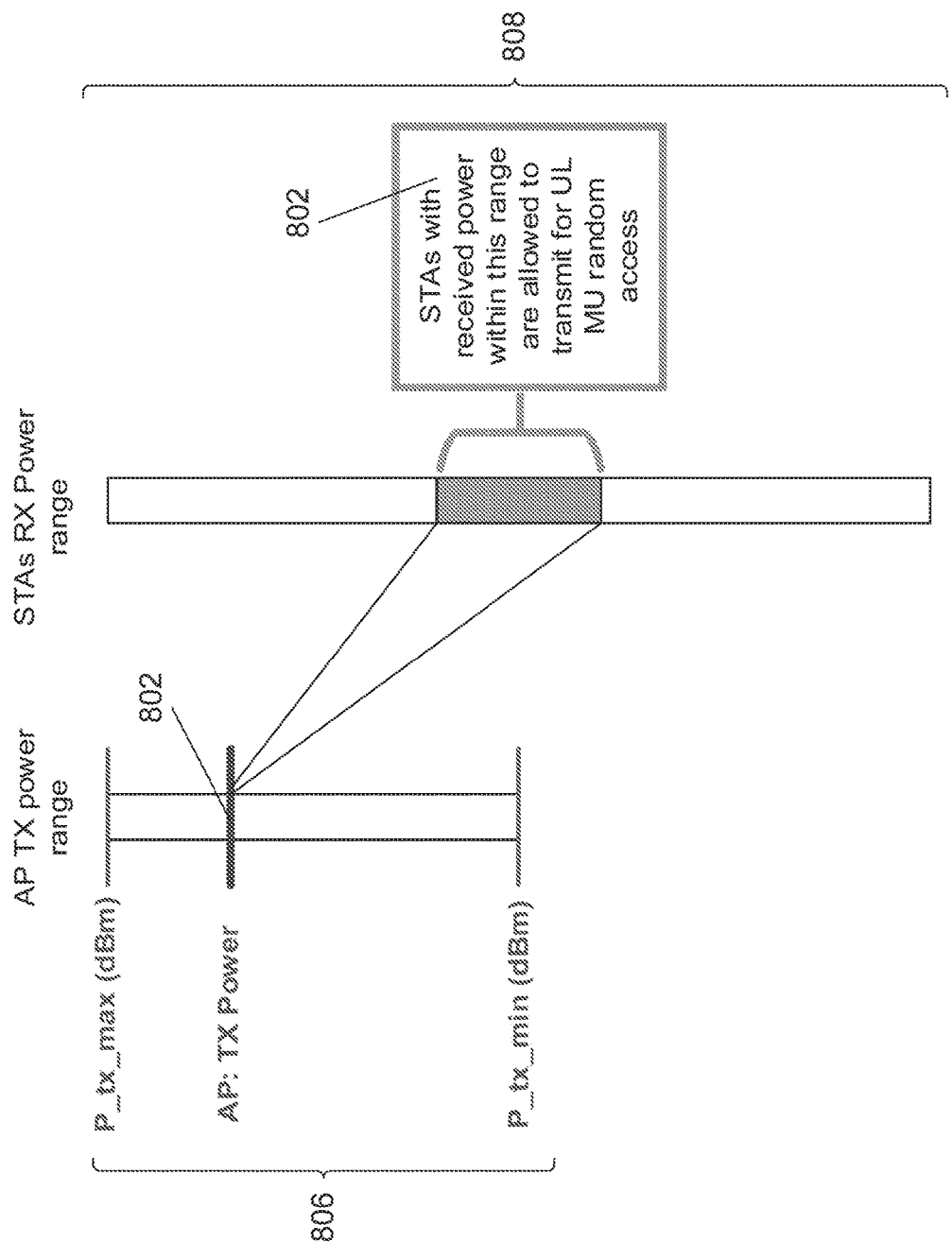
FIG. 8 illustrates random access with restrictions derived from a received power range.

FIG. 8 shows an AP Tx power range 802 where STAs 604, 606, 608, 702 with a Rx power range 804 corresponding to the Tx power range 802 may be allowed to transmit for UL MU random access. The Tx power range 802 may be a portion of an overall AP Tx power range 806 in which the AP 602 may transmit. The Rx power range 804 may be a portion of an overall STA Rx power range 808.

Information used for determining the Rx power range 804 and/or link margin may include a maximum path loss, APLM, a link margin in dB, a link margin index with a positive integer value (e.g., 0 to 128), and a SNR margin that may include received SNR relative to receiver sensitivity.

A range may then be specified using any combination or all of the information disclosed herein. For example a link margin index range may be defined as the following:

$$\text{Link Margin Range}(0\text{-}256)=\text{Link Margin}_{max}-\text{Link Margin}_{min}. \quad \text{Equation (22)}$$

For this definition, a STA 604, 606, 608, 702 may have to anticipate exceeding Link Margin$_{min}$ and be within the link margin range for it to join the UL MU random access pool.

The AP 602 may also indicate the transmit power, denoted as P$_{tx\_ap}$, used to transmit the trigger frame. The STAs 604, 606, 608, 702 with received power within the range may set their transmit power as P$_{tx\_sta}$=P$_{tx\_ap}$ in the upcoming random access frame. Alternatively, in the trigger frame, the AP 602 may indicate the transmit power used to transmit the trigger frame (P$_{tx\_ap}$), and a power offset (P$_{delta}$). The STAs 604, 606, 608, 702 with received power within the range may set their transmit power as P$_{tx\_sta}$=P$_{tx\_ap}$−PΔ in the upcoming random access frame. It should be noted that additional bandwidth and antenna gain may be counted.

In an embodiment, a TPC capability for UL MU random access is disclosed. The STAs, for example the k$^{th}$ STA 702 and the AP 602 may indicate their capabilities for power control with UL MU random access. The AP 602 may include in its beacon, probe response, association response or any other type of frames, an indicator that the AP 602 is capable of power control or, more specifically, power control for UL MU random access. The UL MU random access TPC capability indicator may be included in any existing or new field, such as an information element (IE) in management, control or other frame types. The UL MU random access TPC capability indicator may be included in MAC or PLCP headers. Similarly, the k$^{th}$ STA 702 may indicate TPC capability UL MU random access as well using one or more indicators in a probe request, association request, or other management, control or other frame types. The k$^{th}$ STA 702 may indicate TPC capability UL MU random access in MAC or PLCP headers.

The following description may include an updated TPC report for IEEE 802.11ax and open loop TPC calibration. Embodiments described herein may address transmit power control for fast moving STAs.

In IEEE 802.11 specifications, the STA that wants to transmit may send a TPC request to the receiving STA. The receiving STA may then reply with information in a TPC report frame to enable the STA that wants to transmit do so with the correct transmit power. The use of the TPC report frame in IEEE 802.11h may result in information that does not incorporate the receiver sensitivity. The open loop link margin index in IEEE 802.11ah may address this problem, but may not be suitable for fast moving STAs. In IEEE 802.11ax, where receiver sensitivity may be needed for fast moving STAs with different MCS, there may be a need to modify the TPC report to enable transmission of the full information. It should be assumed without a loss of generality that a STA would like to transmit to the AP as a receiver.

For a downlink transmission, the received signal strength at the STA, RSSI$_{STA}$, may be defined as:

$$RSSI_{STA}=P_{tx\text{-}AP}-Ploss \rightarrow RSSI_{STA}=Ploss=P_{tx\text{-}AP}-RSSI_{STA}, \quad \text{Equation (23)}$$

where P$_{tx\text{-}AP}$ may be the transmit power at the AP and Ploss may be the path loss, which may include shadowing and fast fading between the STA and the AP.

For an uplink transmission, the received signal strength at the AP, RSSI$_{AP}$, may be defined as:

$$RSSI_{AP}=P_{tx\text{-}STA}-Ploss, \quad \text{Equation (24)}$$

where P$_{tx\text{-}STA}$ may be the transmit power at the STA. The link margin (ΔMCS) may be defined as the difference between the received power at the AP and the power required to decode a desired MCS (R$_{req}$) with:

$$RSSI_{AP}-R_{req}=\Delta MCS \rightarrow RSSI_{AP}=\Delta MCS+R_{req}. \quad \text{Equation (25)}$$

Combining these equations results in:

$$P_{tx\text{-}STA}-P_{tx\text{-}AP}+RSSI_{STA}=\Delta MCS+R_{req} \quad \text{Equation (26)}$$

with $$P_{tx\text{-}STA}=\Delta MCS+P_{tx\text{-}AP}+R_{req}-RSSI_{STA}. \quad \text{Equation (27)}$$

Sending ΔMCS, P$_{tx\text{-}API}$ and R$_{req}$, may enable the STA to estimate a correct transmit power. These may be sent individually in a frame to the STA in the new TPC report. Alternatively, the existing TPC report sends the AP, or receiver, transmit power (P$_{tx\text{-}Ap}$) and the MCS link margin (ΔMCS). The existing open loop link margin index sends the sum of the AP, or receiver, transmit power and the receiver requirements (P$_{tx\text{-}AP}$+R$_{req}$). Thus, sending both the MCS link margin and the open loop link margin index may give the STA, or transmitter, enough information to estimate its transmit power correctly even for fast moving STAs.

In an embodiment, a new TPC report for use in, for example, IEEE 802.11ax may be used. The TPC report frame format may include an element ID, length, open loop link margin index (OLLMI) that equals:

$$OLLMI=P_{tx\_ap}+Rx_{sensitivity\_mcs}=P_{tx\_ap}+\Delta MCS, \quad \text{Equation (28)}$$

and the link margin equals:

$$\text{Link Margin}=RSSI_{AP}-Rx_{sensitivity\_mcs}=RSSI_{AP}-\Delta MCS. \quad \text{Equation (29)}$$

Additional information such as the MCS dependent Rx$_{sensitivity}$ and the transmit power headroom available may be sent. For the MCS dependent RX$_{sensitivity}$, the TPC request may be updated to include the MCS for which the Rx sensitivity in the TPC report should be sent.

In another exemplary frame format, a frame may include an element ID, length, transit power=P$_{tx\text{-}AP}$, a link margin that equals as defined above in Equation (30), and Rx$_{sensitivity}$=R$_{req}$. As in the first format, fields for the MCS$_{used\_for\_Rx\_sensitivity}$ and the transmit power headroom available may also be added.

In the case where an AP or STA decides which of the specific parameters to send back (e.g., ΔMCS, P$_{tx\text{-}AP}$, or R$_{req}$) frame format may be constructed that sends back any combination of the three parameters with a bitmap indicating which of the three parameters are sent to limit the number of fields fed back. In an embodiment, a 3-bit bitmap that may be used to specify if the transmit power, the link margin and/or the link margin index is sent as shown in Table 1.

TABLE 1 bitmap of information fed back in the TPC report

| Tx power | Link Margin | Link Margin Index |
|---|---|---|
| 0 | 0 | 1 |
| 0 | 1 | 0 |
| 0 | 1 | 1 |
| 1 | 0 | 0 |
| 1 | 0 | 1 |
| 1 | 1 | 0 |
| 1 | 1 | 1 |

This bit format may be included as part of the element ID or as part of the frame itself. The bitmap may determine the size of the feedback frame. As an example, in a scenario where the AP transmit power stays constant, there may be no need to feed back the AP transmit power and the first bit is always set to zero.

Different STAs may use different TPC implementations, and the transmit power that is estimated based on the TPC report may result in a different $RSSI_{AP}$ from what is expected. To verify that the correct power levels are being set by the individual STA, additional methods may be needed.

In an embodiment, the receiver may determine the desired receive power and send instructions to the transmitter to adjust its power by a desired amount. This may be a closed loop approach.

In an embodiment, the transmitter may desire to find out if its estimate of the RSSI at the transmitter is correct. This may be an open loop approach. The following description may include an open loop calibration procedure to enable this open loop verification of the signal level received by the receiver. The open loop calibration frames may be sent to the receiver to ensure that power received is equivalent to what was expected at receiver. In this case, the transmitting STA may send out a calibration request to the receiver and the receiver may reply with a metric to indicate the received power to the transmitting STA. The metric may be as simple as the RSSI of the AP based on the power received from that STA. Alternatively, the transmitter may send information on the desired level at the receiver and the receiver may then reply with information on the difference, or whether the value seen is above or below the requested value. The transmitting STA may then use this information to correct the transmit power it should use.

The following description may include a procedure that may be used between a transmit-receive pair. The transmitter may send a TPC request to the receiver. In an embodiment, the TPC request may be a simple frame with a specific element ID and no additional information. Alternatively, the TPC request may explicitly request specific information, for example, transmit power, link margin for a specific MCS and/or link margin index. The receiver may send an updated TPC report from the transmitter. Immediately, or at a delayed time, the transmitter may send a TPC calibration request to the receiver. This may be a simple request frame, or it may include information on the expected RSSI at the receiver based on the information received in the TPC report.

The receiver may send an acknowledgement that includes information to help calibrate the STA's open loop power control. This information may be simple bits that indicate whether the received signal level is above, below or equal to the desired received power. Alternatively, the information may be the difference in power between the desired and actual received power. In an embodiment, the feedback may continue until the desired power is achieved. In an embodiment, the calibration frame may be a simple request to increase or decrease the STA's transmit power by a desired amount.

The following description may include power control methods and procedures for UL MU OFDMA transmissions. Embodiments may address issues raised with regard to power control with UL MU transmissions. In an embodiment, TPC procedures for UL MU OFDMA transmission, which may include may include data frames or control frames, are presented. The methods and procedures may be implemented when all the OFDMA transmissions are assigned by the AP.

Figure 9:
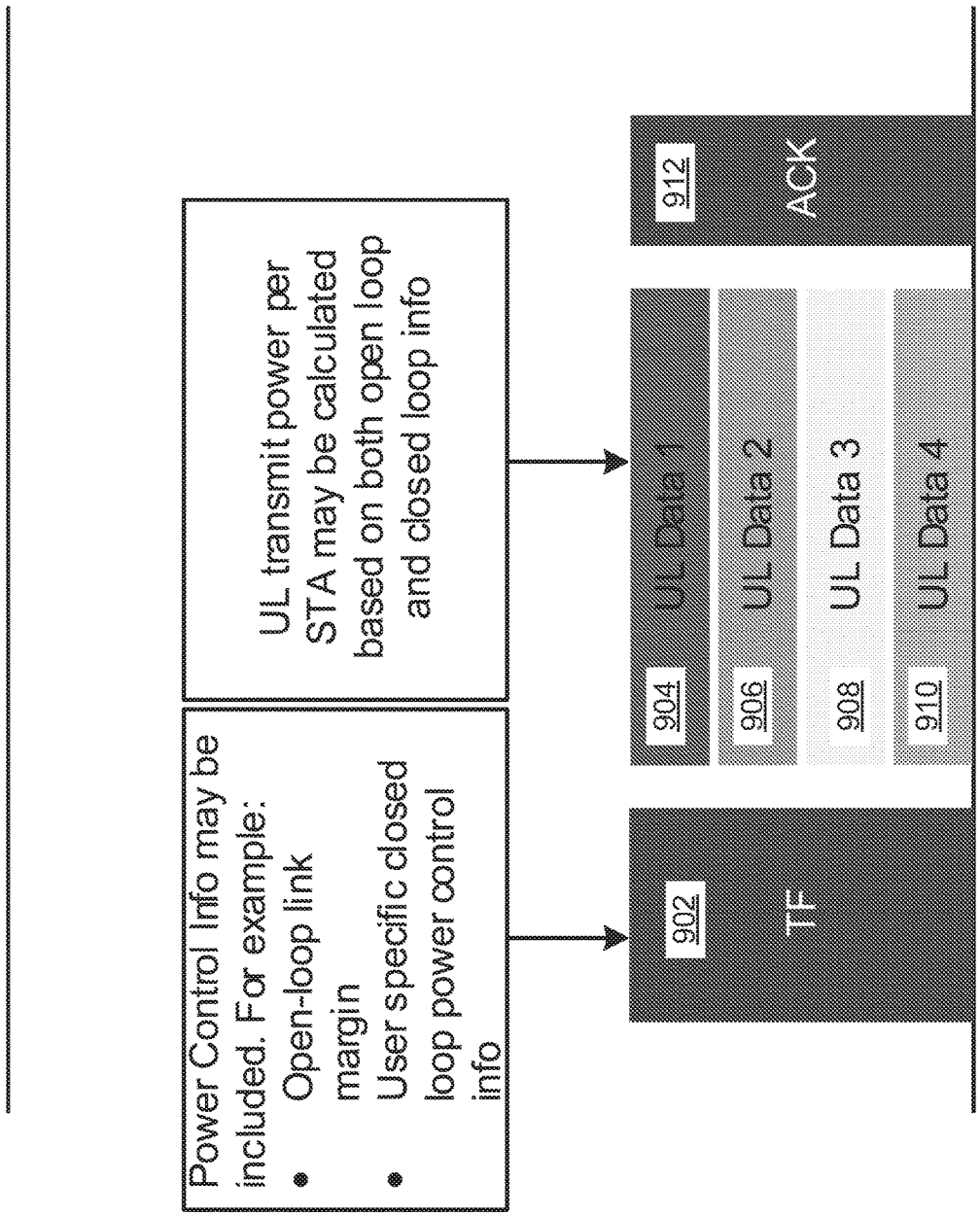
FIG. 9 illustrates TPC for uplink (UL) data.
Figure 10:
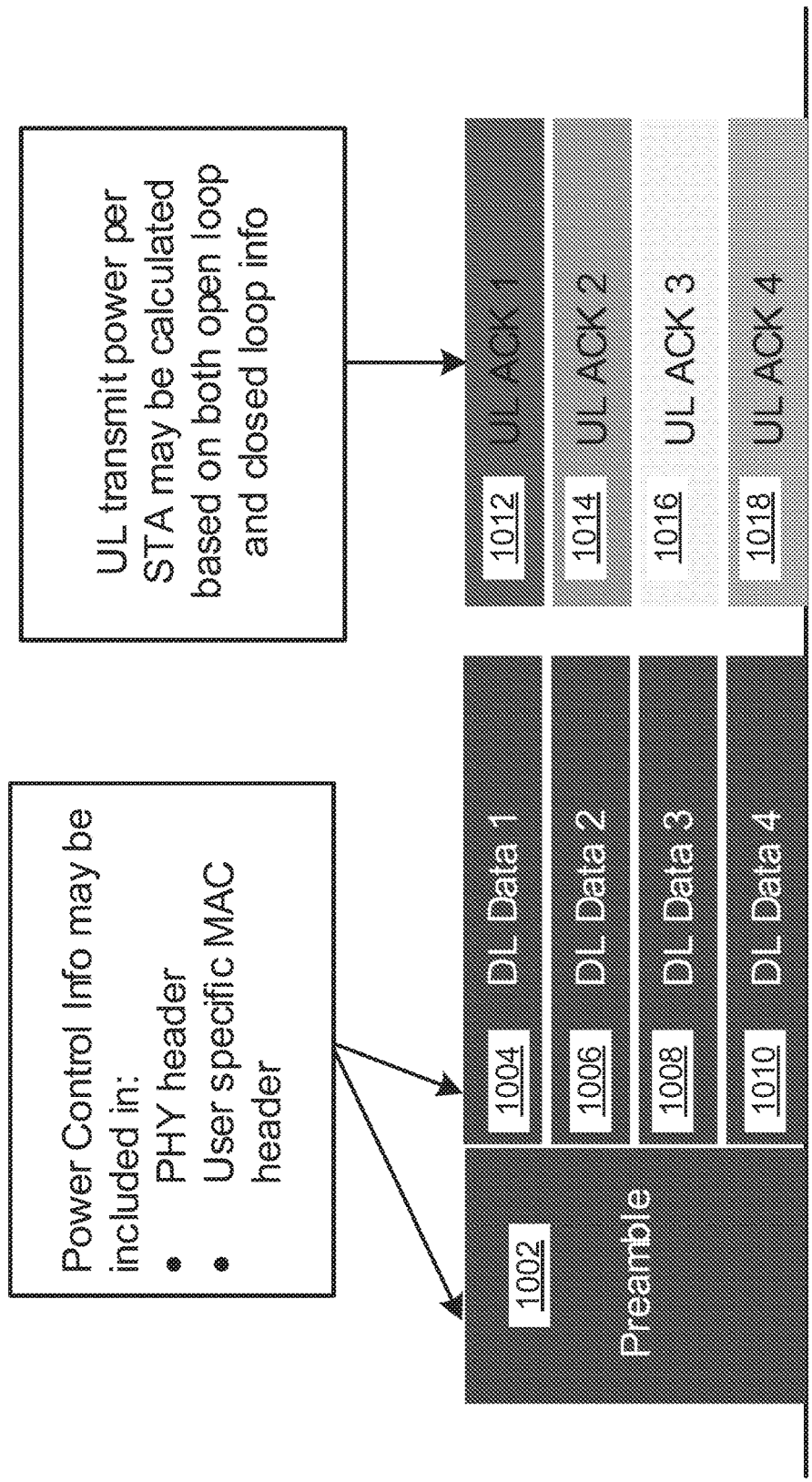
FIG. 10 illustrates TPC for UL control frames including UL acknowledgements (ACK)
Figure 11:
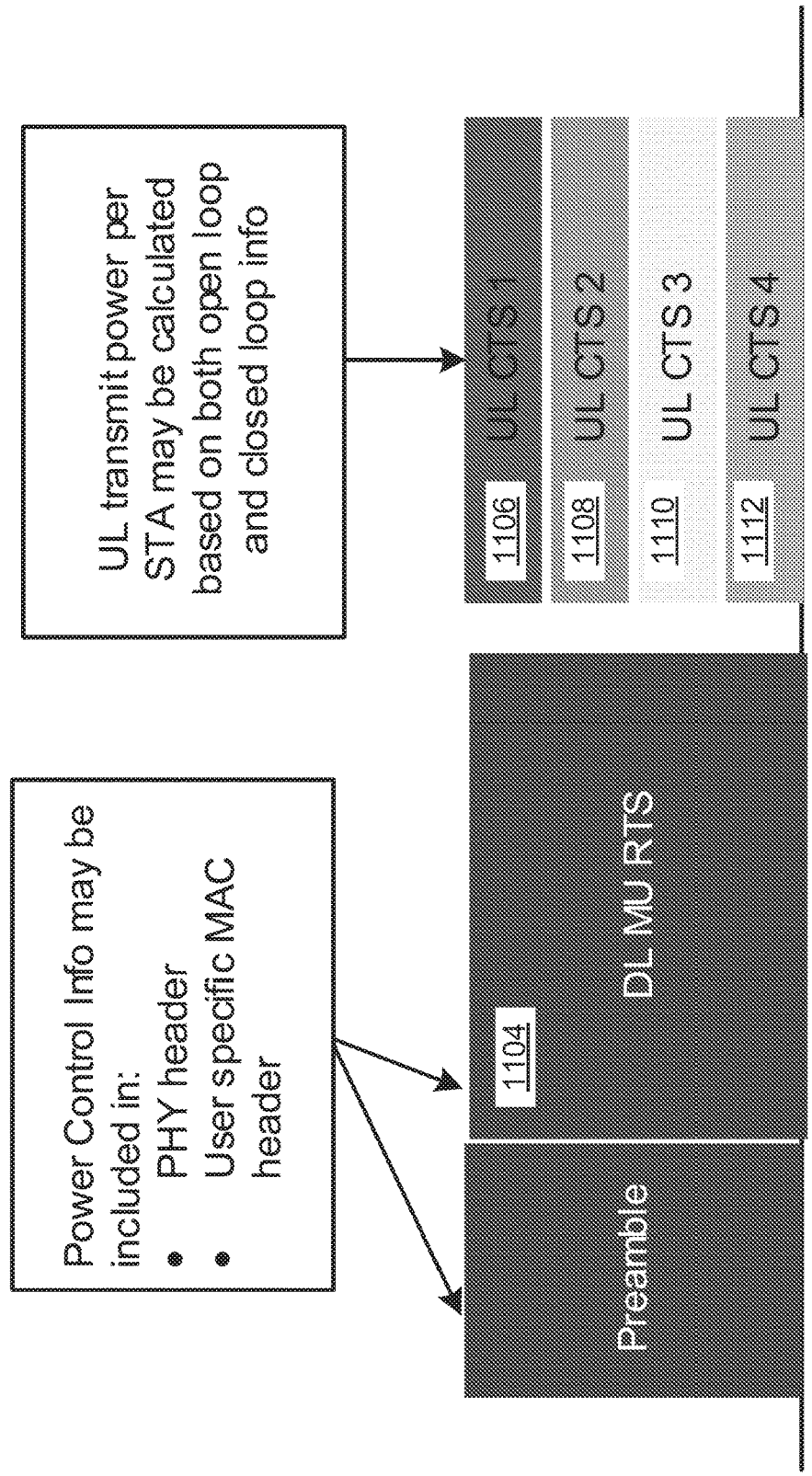
FIG. 11 illustrates TPC for UL control frames including UL clear to send (CTS)

The TPC information may be included in the trigger frame as shown in FIG. 9 for the UL data frames or in the preamble or DL DATA/DL MU RTS as shown in FIG. 10 and FIG. 11 for control frames. For cascaded transmissions as shown in FIG. 11, the transmit power control information for each UL transmission in the cascade may be placed in the cascaded trigger. In the case of the cascaded transmission, if a STA is repeated, a TPC adjustment value may be used as in the disclosed calibration frame to correct for any errors in the original transmission. The transmit power control information may include any of the information disclosed herein.

Referring now to FIG. 9, a diagram illustrating a TPC procedure for UL data frames is shown. FIG. 9 shows an exemplary procedure for UL MU-OFDMA data transmission with power control. In this example, the AP may acquire the channel with 4 OFDMA resource units. In a DL trigger frame 902, the AP may assign OFDMA resource units 1 to 4 to specific users. At a SIFS duration after receiving the trigger frame 902, the STAs may send information to the AP in UL Data frames 904-910 using the TPC and assignment information provided in the trigger frame 902. Subsequently, the AP may send an acknowledgement frame 912 of the UL MU transmission.

An AP-side process of the above TPC procedure for UL data frames is disclosed herein. The AP may acquire the channel medium either through contention or scheduling. The AP may transmit a trigger frame. The trigger frame may be transmitted with one or more of the methods disclosed herein. The trigger frame may be transmitted as a standalone frame as shown in FIG. 9. The DL transmission may be in OFDM mode. In an embodiment, the trigger frame, as a MAC frame, may be aggregated with other frames including one or more data frames, control frames, and/or management frames using an A-MPDU format. The transmission may be in OFDM mode, OFDMA mode, or in another MU mode. The AP may transmit the trigger frame and other frames including data frames, control frames and management frames in a MU mode, for example, DL OFDMA or another MU mode. If the trigger frame is transmitted in DL OFDMA mode, the resource allocation field in SIG-B of the trigger frame may use a reserved broadcast or multicast ID to indicate the corresponding OFDMA resource units are assigned for trigger frame transmission. A broadcast or multicast ID utilized in SIG-B field may indicate that all the STAs may need to monitor and decode the information carried on the resource units.

The AP may include the open-loop power control index, index 1, in the trigger frame. In one method, the open-loop link margin index may be defined in an similar way as IEEE 802.11ah:

$$\Delta_{OPLM} = P_{tx} + RX_{sensitivity}. \qquad \text{Equation (30)}$$

However, the receiver sensitivity $RX_{sensitivity}$ may be redefined as the minimum required receive power for reception of the lowest MCS for the basic channel bandwidth. For example, with IEEE 802.11ax, it may refer to 20 MHz or other bandwidth. This may be standardized, such that STAs may know the definition explicitly. The open-loop link margin $\Delta_{OPLM}$ may be calculated as $(-128+D \times G)$ dB, where D may be the open-loop link margin index and G may be the basic granularity. For example, G=0.25 or 0.5.

The AP may include a power alignment index, index 2, in the trigger frame. This power alignment index may be a targeted link margin, or receive power expected at the AP side. In the case of UL MU transmissions, all the STAs may try to reach the AP using the targeted power level.

The AP may include user specific power adjustment parameters in the trigger frame. For the resource units assigned to random access STAs, the power adjustment parameters may be the same among the random access STAs. The power adjustment parameters may or may not be the same for all the recipients of the trigger frame.

The AP may include any of the updated TPC report frames described above. After SIFS time, the AP may receive UL transmissions from multiple STAs while the STAs may adjust their transmit power according to baseline transmit power and transmit power adjustment values received in the preceding trigger frame. On OFDMA resource units assigned to dedicated STAs, the AP may receive the data, control, or management frames from the assigned STAs.

SIFS time after the reception of UL MU transmissions, the AP may transmit a multi-STA acknowledgement frame or block ACK frames to the STAs.

A STA-side process of the above TPC procedure for UL data frames is disclosed herein. The STA may detect a trigger frame which it may assign at least one OFDMA resource unit for UL MU random access in the upcoming UL OFDMA transmission. In the case that the DL transmission from the AP is in OFDMA mode, the STA may check the SIG-B field for resource allocation for the trigger frame.

The STA may prepare for the transmission in the assigned UL MU random access resource if the STA has one or more uplink control, management, or data frames to transmit.

The STA may set the transmit power according to any of the methods disclosed herein. The STA may check the value of index 1, carried in the trigger frame. The STA may check the value of index 2, carried in the trigger frame. The STA may calculate the baseline transmit power based on index 1 and index 2. The STA may check the power adjustment parameter carried in the trigger frame, and increase or decrease baseline transmit power accordingly. If the STA communicated with the AP within a certain time period, the STA may have transmit power control related parameters in records. The STA may weigh the historical transmit power control related parameters and combine with the instantaneous transmit power acquired from any one or more of the values or parameters received in the trigger frame. The STA may adjust the calculated transmit power according to transmit bandwidth and antenna settings. The STA may confirm that the transmit power calculated through any disclosed method does not violate the maximum allowed transmit power and transmit power density. Otherwise, the STA may use the maximum allowed transmit power instead.

SIFS time after the transmission, the AP may receive acknowledgement frames from the STA.

Referring now to FIG. 10, a diagram illustrating a TPC procedure for UL control frames, for example, ACK frames, is shown. FIG. 10 further shows exemplary procedures for UL MU-OFDMA control transmission with power control. In this example, the AP may acquire the channel with 4 OFDMA resource units and may transmit DL data 1004-1010 to 4 different STAs. At a SIFS duration after the DL data 1004-1010 arrives at the STAs, the STAs may send acknowledgement frames 1012-1018 of the DL MU transmission to the AP. The STAs may use TPC information placed either in a preamble 1002 sent to all STAs or user specific PHY headers sent in each of the DL data frames 1004-1010 to enable them estimate the correct transmit power to use.

An AP-side process of the above TPC procedure for UL control frames is disclosed herein. The AP may acquire the channel medium either through contention or scheduling. The AP may transmit a preamble 1002 and/or one or more DL data frames 1004-1010 to the users. The AP may include the open-loop power control index, index 1, in the preamble 1002 or one or more of the DL data frames 1004-1010. In one method, the open-loop link margin index may be defined in an similar way as IEEE 802.11ah:

$$\Delta_{OPLM} = P_{tx} + RX_{sensitivity}. \quad \text{Equation (31)}$$

However, the receiver sensitivity $RX_{sensitivity}$ may be redefined as the minimum required receive power for reception of the lowest MCS for the basic channel bandwidth. For example, with IEEE 802.11ax, it may refer to 20 MHz or another bandwidth. This may be specified in the standard, such that STAs may know the definition explicitly. The open-loop link margin $\Delta_{OPLM}$ may be calculated as $(-128 + D \times G)$ dB, where D may be the open-loop link margin index and G may be the basic granularity. For example, G=0.25 or 0.5.

The AP may include a power alignment index, index 2, in the preamble 1002 or one or more of the DL data frames 1004-1010. This power alignment index may be a targeted link margin, or receive power expected at the AP side. In the case of UL MU transmissions, all the STAs may try to reach the AP using the targeted power level.

The AP may include user specific power adjustment parameters in preamble 1002 or one or more of the DL data frames 1004-1010. For the resource units assigned to random access STAs, the power adjustment parameters may be the same among the random access STAs. The power adjustment parameters may or may not be the same for all the recipients of the preamble 1002 or one or more of the DL data frames 1004-1010. The AP may include any of the updated TPC report frames disclosed above.

After SIFS time, the AP may receive UL ACKs 1012-1018 from multiple STAs while the STAs may adjust their transmit power according to baseline transmit power and transmit power adjustment values received in the preceding preamble 1002 or one or more of the DL data frames 1004-1010.

A STA-side process of the above TPC procedure for UL control frames is disclosed herein. The STA may detect a trigger frame or the preamble 1002 or one or more of the DL data frames 1004-1010. The trigger frame may assign at least one OFDMA resource unit for UL MU random access in the upcoming UL OFDMA transmission. In the case that the DL transmission from the AP is in OFDMA mode, the STA may check the SIG-B field for resource allocation for the trigger frame.

The STA may prepare for the transmission in the assigned UL MU random access resource if the STA may have one or more uplink control, management, or data frames to transmit.

The STA may set the transmit power according to the disclosed methods. The STA may check the value of index 1, carried in the preamble 1002 or one or more of the DL data frames 1004-1010. The STA may check the value of index 2, carried in the preamble 1002 or one or more of the DL data frames 1004-1010. The STA may calculate the baseline transmit power based on index 1 and index 2. The STA may check the power adjustment parameter carried in the preamble 1002 or one or more of the DL data frames 1004-1010, and may increase or decrease baseline transmit power accordingly. If the STA communicated with the AP within certain time period, the STA may have transmit power control related parameters in records. The STA may weight that historical transmit power control related parameters and combine with the instantaneous transmit power acquired from any one or more of the values or parameters received in the preamble 1002 or one or more of the DL data frames 1004-1010. The STA may adjust the calculated transmit power according to transmit bandwidth and antenna settings. The STA may confirm that the transmit power calculated through any disclosed method does not violate the maximum allowed transmit power and transmit power density. Otherwise, the STA may use the maximum allowed transmit power instead.

SIFS time after the transmission, the STA may receive an acknowledgement frame from the AP.

Referring now to FIG. 11, a diagram illustrating a TPC procedure for UL control frames with UL Clear to Send (CTS). FIG. 11 shows exemplary procedures for UL MU-OFDMA control transmission with power control. In this example, the AP may acquire the channel from 4 STAs and may transmit a downlink multi-user Request to Send (RTS) 1104. At a SIFS duration after the DL MU RTS arrives at the users, the STAs may send a MU CTS to the AP, shown as UL CTS frames 1106-1112. In one embodiment, each UL CTS 1106-1112 may be sent on a separate subframe. In this case, the procedure may similar to the UL data transmission method described above with reference to FIG. 9. In another embodiment, each STA may send a full bandwidth CTS with the information RF combined at the receiver. In this case, the AP may request that each STA send a fraction of its estimated power to prevent the combined CTS from overwhelming the AGC. The fraction may be explicitly suggested by the AP or may be implicitly estimated by the STA based on the number of STAs that are in the MU RTS. For example, with 4 STAs in the MU-RTS, the transmit power may be scaled by 4 or by 2 if it is estimated that 2 of the STAs may not reply.

Figure 12:
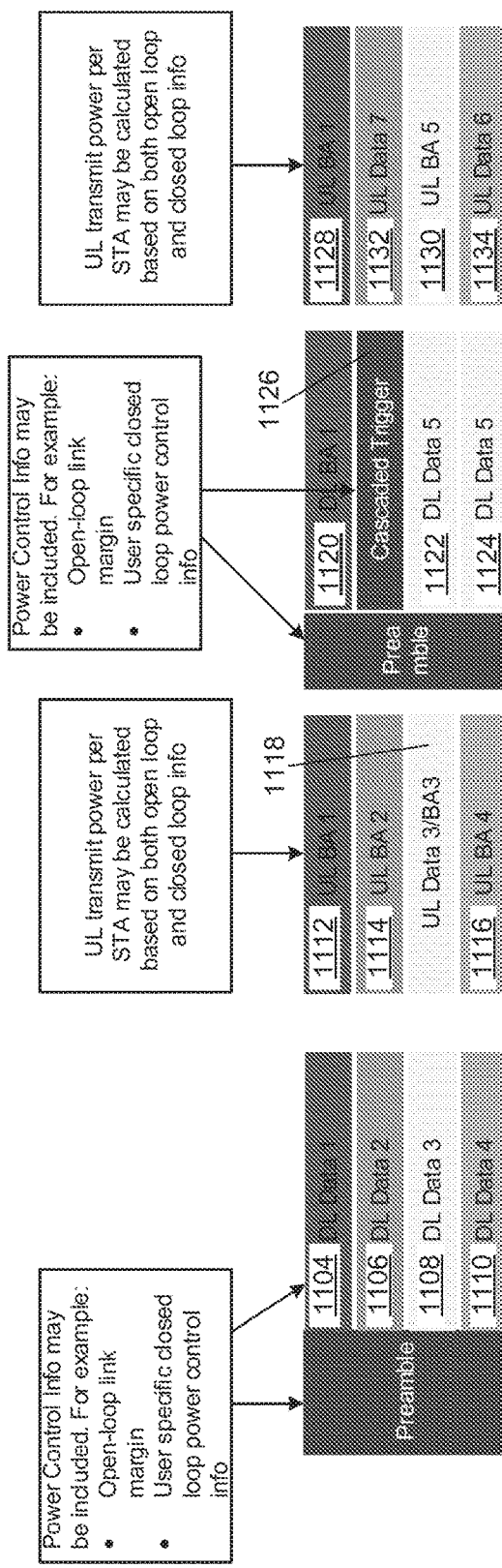
FIG. 12 illustrates TPC for cascaded UL and downlink (DL) transmission.

Referring now to FIG. 12, a diagram illustrating a TPC procedure for cascaded UL/DL MU OFDMA transmissions is shown. FIG. 12 shows an exemplary procedure for cascaded UL and DL transmission data transmission with power control. In this example, the AP may acquire the channel with 4 OFDMA resource units. In a DL trigger frame, which may be sent in a preamble 1202 or in DL data frames 1004-1010, the AP may assign OFDMA resource units 1 to 4 to specific users and transmit information in them as the DL data frames 1004-1010. At a SIFS duration after the trigger frame, the STAs may send ACK frames 1112-1116 and/or ACK and data frames 1118 to the AP using the TPC and assignment information in the preamble or in the user specific MAC headers. Subsequent transmissions by the AP may include, a DL ACK frame 1120, DL data frames 1122-1124 and a cascaded trigger frame 1126 to the STAs. The STAs may then use this cascaded trigger frame that may contain additional TPC information to send additional ACK frames 1128-1130 and addition UL data 1132-1134 to the AP. The AP and STA TPC procedures in this case may be similar to the procedures for the non-cascaded structures described above.

Figure 13:
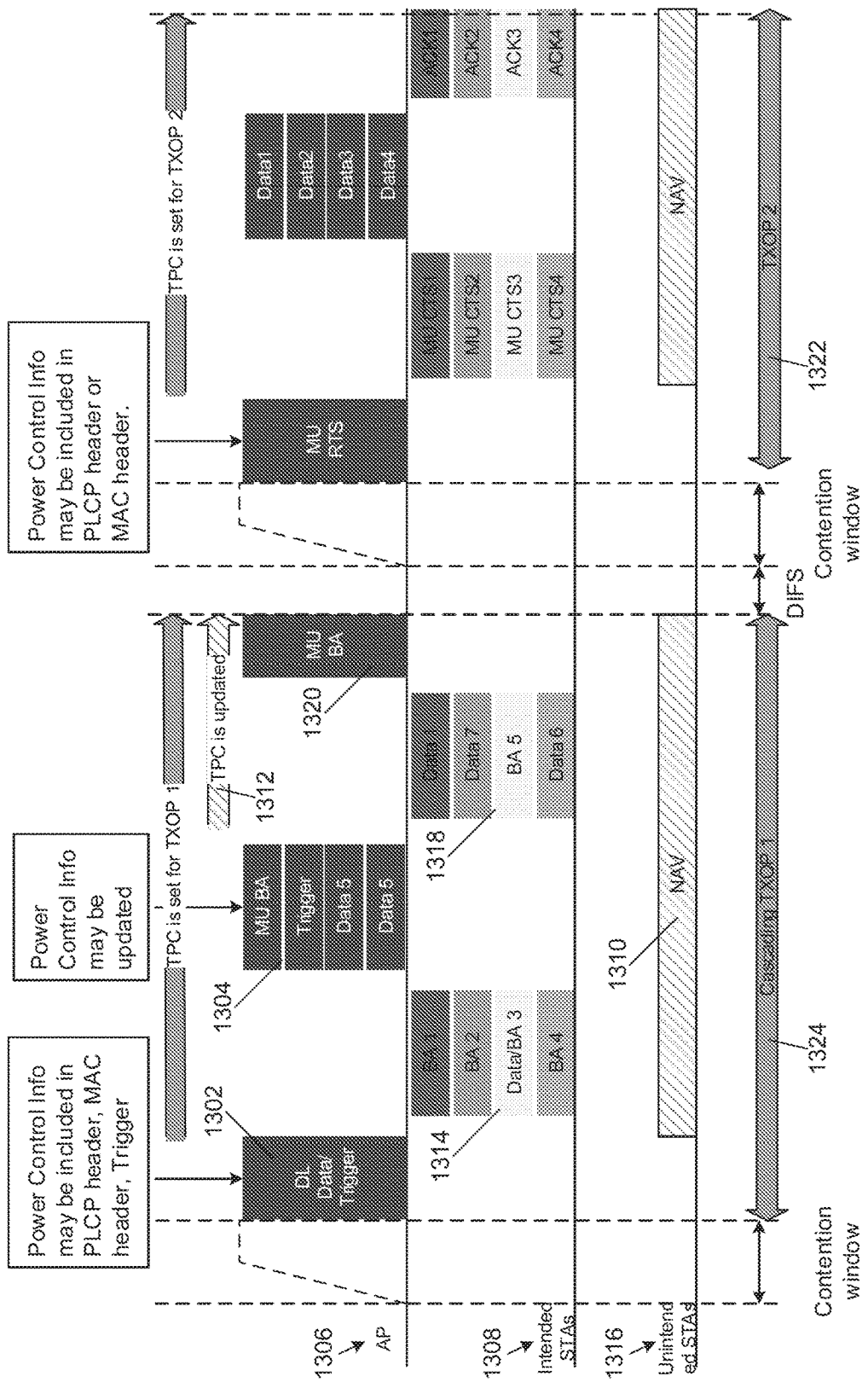
FIG. 13 illustrates a TPC procedure with a cascaded transmit opportunity (TXOP).

Referring now to FIG. 13, a diagram illustrating Transmit Opportunity (TXOP) based TPC. In an embodiment, the TPC may be applied to a particular TXOP. Within the TXOP, a network allocation vector (NAV) setting 1310 and TPC information 1312 may be updated.

In an embodiment, an AP 1306 may acquire a channel medium using either a contention or scheduling based method and the AP may begin a cascading TXOP with a DL transmission 1302, which may be a DL MU-PPDU that is sent to multiple users. In the DL transmission 1302, the TPC information may be carried in a PLCP header, a MAC header, and/or a broadcast/multicast/unicast trigger frame. In an embodiment, the AP 1306 may include the open-loop power control index (index 1) in the DL transmission 1302. In an embodiment, the open-loop power control index (index 1) may be carried in a separate trigger frame. In another embodiment, the open-loop power control index (index 1) may be carried in a MAC header of each DL MAC frame in the DL transmission 1302.

The AP 1306 may include a power alignment index (index 2) in the DL transmission 1302. In an embodiment, the power alignment index (index 2) may be carried in the separate trigger frame. In another embodiment, the power alignment index (index 2) may be carried in a MAC header of each DL MAC frame in the DL transmission 1302. This power alignment index (index 2) may be a targeted link margin or receive power expected at the AP 1306 side. In following UL MU transmissions, one or more intended STAs 1308 may try to reach the AP using the targeted power level.

The AP 1306 may include user specific power adjustment parameters in the DL transmission 1302. For the resource units assigned to random access intended STAs 1308, the power adjustment parameters may be the same among the random access intended STAs 1308. The power adjustment parameters may or may not be the same for all the recipients of index 1 and/or index 2 in the DL transmission 1302 and/or trigger frame. The AP 1306 may include any of the updated TPC report frames discussed above.

The intended STAs 1308 may adjust transmit power for UL MU transmissions according to the received TPC information. After SIFS time, the AP 1306 may receive trigger-based UL PPDUs or UL ACKs/BAs in an UL MU transmission 1314 from one or more indented STAs 1308. The one or more intended STAs 1308 may adjust their transmit power according to baseline transmit power and transmit power adjustment values received in the preceding DL transmission 1302.

The AP 1306 may cascade one or more DL transmissions 1304 after receiving the UL MU transmission 1314 from the one or more intended STAs 1308. The AP 1306 may use the cascaded transmission 1304 to transmit DL MU-PPDU to another set of STAs 1308. The new set of intended receiving STAs 1308 may or may not be the same as the previous set, or a portion of the previous set. The AP 1306 may or may not update the TPC information in the cascaded DL frame 1304. The AP 1306 may include updated power control information, such as index 1, index 2, power adjustment parameters, and/or an updated TPC report to the new set of STAs 1308 in a PLCP header, MAC header, and/or trigger frame. The power control information may or may not be the same as that transmitted in the DL transmission 1302. If the AP 1306 does not include updated power control information, the STAs 1308 may reuse the information transmitted in the DL transmission 1302. In the cascaded DL frame 1304, the AP 1306 may also update the duration information, such that unintended STAs 1316 may update a NAV setting 1310 accordingly.

After SIFS time, the AP may receive trigger-based UL PPDUs or UL ACKs/BAs from the STAs 1308 in an UL transmission 1318. The STAs 1308 may adjust their transmit power according to baseline transmit power and transmit power adjustment values received in the preceding cascaded DL transmission 1304. After SIFS time, the AP 1306 may transmit a MU BA 1320 to the STAs 1308.

Subsequently, the AP 1306 may acquire the channel medium again either through contention or scheduling. The AP 1306 may start a new TXOP 1322. In this TXOP 1322, power control related information may be carried in the TXOP. In an embodiment, the power control information may be exchanged similar to the steps in the preceding cascading TXOP 1324. In the case that power control information is not carried in the TXOP 1322, the STAs 1308 may use the last power control information received, for example in the preceding cascading TXOP 1324, to setup UL transmission power.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method for use in a station (STA), the method comprising:
   receiving a trigger frame that is broadcast to a plurality of STAs as a single transmission, the trigger frame comprising an indication that one or more resources in an upcoming uplink (UL) multi-user (MU) transmission opportunity are available to one or more STAs of the plurality of STAs for data transmissions, an indicated transmit power that an access point (AP) used to transmit the trigger frame, a first indicated target receive signal power at the AP associated with the STA, and at least a second indicated target receive signal power at the AP associated with a second STA of the plurality of STAs, wherein the first indicated target receive signal power and the second indicated target receive signal power are different;
   measuring a received power of the trigger frame;
   calculating a downlink pathloss of the trigger frame based on the indicated transmit power of the trigger frame and the measured received power of the trigger frame;
   determining a STA transmit power based on the downlink pathloss and the first indicated target receive signal power at the AP; and
   sending a data transmission in the one or more resources using the STA transmit power.

2. The method of claim 1, further comprising:
   adjusting the STA transmit power based on the target receive signal power at the AP.

3. The method of claim 1, wherein the trigger frame further comprises a summation of transmit power and receiver sensitivity.

4. The method of claim 1, wherein the trigger frame further comprises a targeted link margin at the AP, wherein the targeted link margin is defined as a difference between an expected received transmission power at the AP and an AP receiver sensitivity.

5. A station (STA) comprising:
   an antenna; and
   a processor operative coupled to the antenna;
   the processor and the antenna configured to receive a trigger frame that is broadcast to a plurality of STAs as a single transmission, the trigger frame comprising an indication that one or more resources in an upcoming uplink (UL) multi-user (MU) transmission opportunity are available to one or more STAs in the plurality of STAs for data transmissions, an indicated transmit power that an access point (AP) used to transmit the trigger frame, a first indicated target receive signal power at the AP associated with the STA, and at least a second indicated target receive signal power at the AP associated with a second STA of the plurality of STAs, wherein the first indicated target receive signal power and the second indicated target receive signal power are different;
   the processor and the antenna further configured to measure a received power of the trigger frame;
   the processor configured to calculate a downlink pathloss of the trigger frame based on the indicated transmit power of the trigger frame and the measured received power of the trigger frame;
   the processor further configured to determine a STA transmit power based on the downlink pathloss and the first indicated target receive signal power at the AP; and
   the processor and the antenna further configured to send a data transmission in the one or more resources using the STA transmit power.

6. The STA of claim 5, further comprising:
   the processor and the antenna further configured to adjust the STA transmit power based on the target receive signal power at the AP.

7. The STA of claim 5, wherein the information trigger frame further comprises a summation of transmit power and receiver sensitivity.

8. The STA of claim 5, wherein the trigger frame further comprises a targeted link margin at the AP, wherein the targeted link margin is defined as a difference between an expected received transmission power at the AP and an AP receiver sensitivity.

* * * * *